(12) United States Patent
Tsubota et al.

(10) Patent No.: US 8,179,395 B2
(45) Date of Patent: May 15, 2012

(54) IMAGE SPECIAL EFFECT APPARATUS AND IMAGE SPECIAL EFFECT METHOD

(75) Inventors: Kazuhiro Tsubota, Kanagawa (JP); Hiroyuki Izumi, Kanagawa (JP)

(73) Assignee: Panasonic Corporation, Osaka (JP)

( * ) Notice: Subject to any disclaimer, the term of this patent is extended or adjusted under 35 U.S.C. 154(b) by 748 days.

(21) Appl. No.: 12/305,752

(22) PCT Filed: Mar. 9, 2007

(86) PCT No.: PCT/JP2007/054720

§ 371 (c)(1),
(2), (4) Date: Dec. 19, 2008

(87) PCT Pub. No.: WO2008/001515

PCT Pub. Date: Jan. 3, 2008

(65) Prior Publication Data

US 2010/0231786 A1 Sep. 16, 2010

(30) Foreign Application Priority Data

Jun. 28, 2006 (JP) .............................. 2006-178445
Aug. 1, 2006 (JP) .............................. 2006-210103

(51) Int. Cl.
*G06T 15/50* (2006.01)

(52) U.S. Cl. ........ 345/426; 345/419; 345/420; 345/424; 345/427; 345/581; 348/478

(58) Field of Classification Search .................. 345/424, 345/427, 581, 649, 660, 672, 426; 348/478
See application file for complete search history.

(56) References Cited

U.S. PATENT DOCUMENTS

| | | | | |
|---|---|---|---|---|
| 4,965,844 A | * | 10/1990 | Oka et al. | 345/581 |
| 5,748,192 A | * | 5/1998 | Lindholm | 345/649 |
| 6,175,367 B1 | * | 1/2001 | Parikh et al. | 345/426 |
| 7,616,802 B2 | | 11/2009 | Tsuboi et al. | |
| 2003/0034981 A1 | * | 2/2003 | Wada | 345/581 |
| 2006/0136532 A1 | | 6/2006 | Tsuboi et al. | |
| 2006/0221074 A1 | * | 10/2006 | Matsumoto | 345/424 |

FOREIGN PATENT DOCUMENTS

| | | |
|---|---|---|
| JP | 05-143746 A | 6/1993 |
| JP | 7-296187 A | 11/1995 |
| JP | 2001-283250 A | 10/2001 |
| JP | 2002-92634 A | 3/2002 |
| WO | 2004/079663 A1 | 9/2004 |

OTHER PUBLICATIONS

International Search Report for PCT/JP2007/054720; May 14, 2007.

* cited by examiner

*Primary Examiner* — Xiao M. Wu
*Assistant Examiner* — Todd Buttram
(74) *Attorney, Agent, or Firm* — Pearn & Gordon LLP

(57) ABSTRACT

An image special effect apparatus capable of realizing the illumination effects corresponding to various image special effects if an illumination effect pattern is not previously determined and the shape of the effect face changes rapidly is provided.

An image special effect apparatus 100 for adding an illumination effect using light from a light source when viewed from an arbitrary eye point in a face having a curved face to image information concerning an input image and outputting a video signal provided by mapping the image information to the face generates a normal vector at a position of the face based on rectangular coordinate data and the shape of the face, a normal vector generation section 110, generates reflectivity of the light in an eye point direction by calculation of A $(2(L \cdot N)N - 2L) \cdot V$ of an expression using the normal vector, a light source direction unit vector, an eye point vector V, and an arbitrary value A, and creates the image information based on the image and the reflectivity.

8 Claims, 21 Drawing Sheets

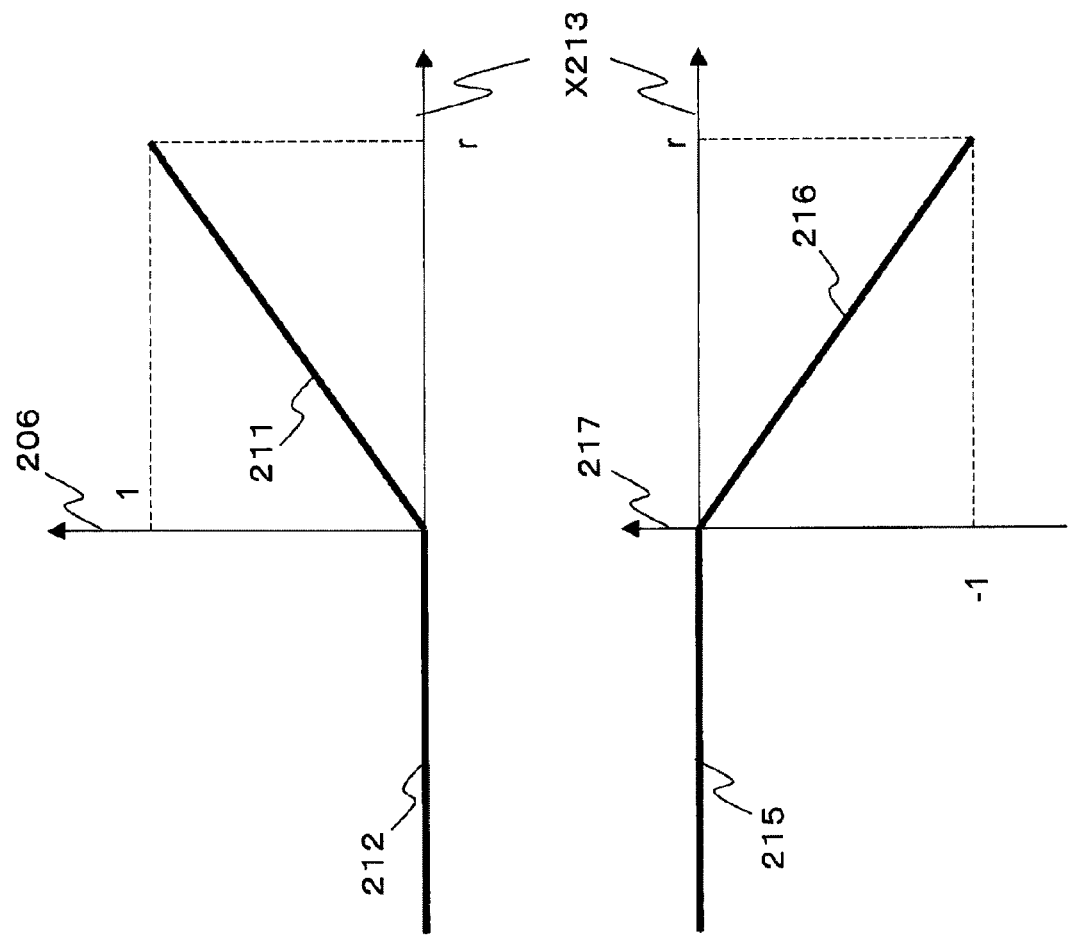

IMAGE SPECIAL EFFECT APPARATUS AND IMAGE SPECIAL EFFECT METHOD

TECHNICAL FIELD

This invention relates to an image special effect apparatus and an image special effect method used for video production, etc., and in particular to simplification and miniaturization of an apparatus that can perform illumination processing considering the relationship between a light source and an eye point, represent the realistic-looking special effects in real time, and deal with a large number of types of special effect images.

BACKGROUND ART

An image special effect apparatus in a related art includes frame memory 1702 and a read address computation section 1709 for computing an image special effect read address 1708 from a sequential write address 1705, as shown in FIG. 17. FIG. 17 is a block diagram of the image special effect apparatus in the related art.

For an input image 1701 sequentially written into the frame memory 1702 according to the sequential write address 1705, an output image 1703 is read from the frame memory 1702 according to the image special effect read address 1708 computed in the image special effect read address computation section 1709, whereby various video effects of page turn effect, ball effect, etc., are applied to the image.

A calculation method of a read address in a display screen horizontal direction when the page turn effect is realized in the image special effect apparatus in the related art is to calculate Xeffect shown as in the following expression for each of a lower flat face part 215, a lower curved face part 216, an upper curved face part 211, and an upper flat face part 212 from a write address x in a sequential display screen horizontal direction X213 as shown in FIG. 18. In FIG. 18, Z214 denotes an eye point direction 214 (z axis), R202 denotes an effect radius 202 ($r$), and θz240 denotes the angle between the eye point direction Z214 and a normal vector. FIG. 18 is a drawing to describe the horizontal coordinate calculation specifications in the image special effect apparatus in the related art.

(Lower flat face part 215) Xeffect=x (Lower curved face part 216) Xeffect=rθz=r×arcsin(x/r)

(Upper curved face part 211) Xeffect=πr/2−rθz=πr/2−r×arcsin(x/r)

(Upper flat face part 212) Xeffect=πr/2−x

A read address calculation method in a display screen vertical direction is to calculate Yeffect shown as in the following expression for each of the lower flat face part 215, the lower curved face part 216, the upper curved face part 211, and the upper flat face part 212 from a write address y in a sequential display screen vertical direction Y222 as shown in FIG. 19. A231 in FIG. 19 denotes an upper face move amount. FIG. 19 is a drawing to describe the vertical coordinate calculation specifications in the image special effect apparatus in the related art.

Expression 1

(Lower flat face part 215) Yeffect=y $$Yeffect = y - a\left\{1 - \sqrt{1 - \frac{x^2}{r^2}}\right\} \quad \text{(Lower curved face part 216)}$$

$$Yeffect = y - a\left\{1 + \sqrt{1 - \frac{x^2}{r^2}}\right\} \quad \text{(Upper curved face part 211)}$$

(Upper flat face part 212) Yeffect=y−2a

Xeffect is display screen horizontal direction data to generate various video effects of page turn effect, ball effect, etc., from sequential display screen horizontal direction data of rectangular coordinates and the result of page turn horizontal coordinate calculation. Yeffect is display screen vertical direction data to generate various video effects of page turn effect, ball effect, etc., from sequential display screen vertical direction data of rectangular coordinates and the result of page turn vertical coordinate calculation. Xeffect and Yeffect are converted into the image special effect read address 1708.

An apparatus for mixing table values storing a plurality of illumination patterns corresponding to the shapes of a plurality of predetermined effect faces to give the illumination effect to an obtained special effect image, thereby providing the illumination effects for the effect faces of various shapes is known (for example, refer to patent document 1).

Patent document 1: JP-A-05-143476

Generally, for a calculation method for realizing the illumination effect of specular reflection, letting a light source vector be L and a normal vector of an effect face be N, a reflection vector R is $R=2(L\cdot N)N-L$            mathematical expression 1 regardless of the shape of the effect face.

DISCLOSURE OF THE INVENTION

Problems to be Solved by the Invention

However, the special effect apparatus in the related art described above involves inconveniences of having to previously determine various illumination patterns and determine an optimum illumination pattern combination responsive to the effect face. Further, to add a new special effect function, an optimum combination may be unable to be found with the already installed illumination patterns.

The inner product of an eye point vector V is calculated in mathematical expression 1, whereby the reflectivity in the eye point direction can be calculated. A calculation circuit of mathematical expression 1 is easily installed in an FPGA device in which abundant multipliers are installed, and the illumination effect produced by combining a flat face and a curved face is consecutive and smooth. However, for example, assuming an effect face like a book having a plurality of pages as a flat face and a curved face are used in combination, there are circumstances under which visibility of the illumination effect is lacked and a special effect image with no accentuation results if operation of page turn is fast.

FIG. 20 shows a calculation expression of a normal vector for the effect of turning a page from the right to the left. FIG. 20 is a drawing to show normal vectors in the image special effect apparatus in the related art. From FIG. 20, normal vectors of the lower flat face part 215, the lower curved face part 216, the upper curved face part 211, and the upper flat face part 212 are represented as in the following expressions:
Expression 2
(Lower flat face part 215) normal vector N=(0, 0, 1)

(Lower curved face part 216)
$$\text{normal vector } N = (-\sin\theta_z, 0, \cos\theta_z)$$
$$= \left(-\frac{x}{r}, 0, \sqrt{1 - \frac{x^2}{r^2}}\right)$$

(Upper curved face part 211)
$$\text{normal vector } N = (\sin\theta_z, 0, \cos\theta_z)$$
$$= \left(\frac{x}{r}, 0, \sqrt{1 - \frac{x^2}{r^2}}\right)$$

(Upper flat face part 212) normal vector N=(0, 0, 1)

In this case, in a display screen horizontal direction component 206 of the normal vector, the change amount of the connection portion of the upper flat face part 212 and the upper curved face part 211 becomes discontinuous and in a display screen horizontal direction component 206 of the normal vector, the change amount of the connection portion of the lower flat face part 215 and the lower curved face part 216 becomes discontinuous, as shown in FIG. 21. Consequently, there are circumstances under which the illumination effect obtained from mathematical expression 1 also becomes discontinuous in the joint of the flat face part and the curved face part and an unnatural illumination effect results.

For example, the upper normal vector horizontal direction component 206 of the upper flat face part 212 is 0; while, the upper normal vector horizontal direction component 206 of the upper curved face part 211 is x/r (sin θz). A lower normal vector horizontal direction component 217 of the lower flat face part 215 is 0; while, the lower normal vector horizontal direction component 217 of the lower curved face part 216 is −x/r (−sin θz). FIG. 21 is a drawing to show the display screen horizontal direction component normal vector characteristics in the image special effect apparatus in the related art.

The invention is embodied considering the circumstances described above and it is an object of the invention to provide an image special effect apparatus and an image special effect method capable of realizing the illumination effects corresponding to various image special effects if an illumination effect pattern is not previously determined and the shape of the effect face changes rapidly. It is also an object of the invention to provide an image special effect apparatus and an image special effect method capable of realizing a natural illumination effect and enabling miniaturization.

Means For Solving the Problems

To accomplish the objects, a first image special effect apparatus of the invention is an image special effect apparatus for adding an illumination effect using light from a light source when viewed from an arbitrary eye point in a face having a curved face to image information concerning an input image and outputting a video signal provided by mapping the image information to the face and has a normal vector generation section for generating a normal vector indicating a vector in a normal direction at a position of the face based on rectangular coordinate data indicating the positions of a horizontal coordinate and a vertical coordinate of the face and the shape of the face; an illumination effect generation section for generating reflectivity of the light in a direction of the eye point by calculation of A (2(L·N)N−2L)·V of an expression using the normal vector, a light source direction unit vector indicating a unit vector in a direction of the light source, an eye point vector V indicating a vector in the eye point direction, and an arbitrary value A; and an image information creation section for creating the image information based on the image and the reflectivity.

According to the configuration, if an illumination effect pattern is not previously determined and the shape of the effect face changes rapidly, the illumination effects corresponding to various image special effects can be realized.

A second image special effect apparatus of the invention has an arbitrary value change section capable of changing the arbitrary value A.

According to the configuration, it is made possible to adjust the illumination effect responsive to lighting or shading processing for a specific portion of page turn and the illumination effect good in visibility can be realized without adding a large-scaled new calculation circuit and the image special effect apparatus can be miniaturized.

In a third image special effect apparatus of the invention, the illumination effect generation section has a plurality of candidates for the generated reflectivity and generates one reflectivity from among the plurality of candidates.

According to the configuration, it is made possible to switch a plurality of types of illumination effect data calculation expressions and the illumination effect in any other image special effect than the page turn effect, such as ball effect can be calculated in a general-purpose manner and the image special effect apparatus can be miniaturized.

A fourth image special effect apparatus of the invention is an image special effect apparatus for adding an illumination effect using light from a light source when viewed from an arbitrary eye point in a face having a flat face and a curved face to image information concerning an input image and outputting a video signal provided by mapping the image information to the face and has a cosine value calculation section for calculating a cosine value of the angle between an eye point direction vector indicating a vector in a direction of the eye point and a normal vector at a position of the face based on the positions of a horizontal coordinate and a vertical coordinate of the face and the shape of the face; a normal vector calculation section for calculating a vector having the cosine value as a component in the eye point direction and (1−cosine value) or (−1+cosine value) of the angle as a component of the horizontal coordinate as a calculation normal vector; and an illumination effect calculation section for calculating the illumination effect based on the calculation normal vector.

According to the configuration, a natural illumination effect can be realized and the apparatus can be miniaturized. For example, the change amount of the horizontal direction component of the normal vector of the connection portion of the flat face part and the curved face part of page turn is found from the calculation result of the eye point direction component, whereby it can be made continuous without adding a large-scaled new calculation circuit, so that while a natural illumination effect is realized, the apparatus can be miniaturized.

In a fifth image special effect apparatus of the invention, if the shape is a page turn shape having an upper face and a lower face, the normal vector calculation section calculates a component of a vertical coordinate of the calculation normal vector based on the cosine value calculated by the cosine value calculation section, the position of the vertical coordinate, and an upper face move amount based on the position shift amount of the upper face and the lower face in the vertical direction.

According to the configuration, the cosine value already calculated for normal vector calculation is used for calculation in the vertical coordinate direction of page turn, whereby the upper face and the lower face do not overlap in shape change of turning a page from the right to the left and a natural page turn effect is provided without adding a large-scaled new calculation circuit and the apparatus can be miniaturized.

A sixth image special effect apparatus of the invention has a sine value calculation section for calculating a sine value of the angle between the eye point direction vector and the normal vector; and a selection section for selecting either of the sine value calculated by the sine value calculation section and (1−cosine value), (−1+cosine value) of the angle calculated by the normal vector calculation section as the component of the horizontal coordinate of the calculation normal vector used for the illumination effect calculation section to calculate the illumination effect.

According to the configuration, the horizontal direction component normal vector can be switched for output, so that general-purpose illumination effect for ball effect in addition to the page turn effect can be calculated without adding a large-scaled new calculation circuit and the apparatus can be miniaturized.

A first image special effect method of the invention is an image special effect method for adding an illumination effect using light from a light source when viewed from an arbitrary eye point in a face having a curved face to image information concerning an input image and outputting a video signal provided by mapping the image information to the face and is a method having the steps of generating a normal vector indicating a vector in a normal direction at a position of the face based on rectangular coordinate data indicating the positions of a horizontal coordinate and a vertical coordinate of the face and the shape of the face; generating reflectivity of the light in a direction of the eye point by calculation of A (2(L·N)N−2L)·V of an expression using the normal vector, a light source direction unit vector indicating a unit vector in a direction of the light source, an eye point vector V indicating a vector in the eye point direction, and an arbitrary value A; and creating the image information based on the image and the reflectivity.

According to the method, if an illumination effect pattern is not previously determined and the shape of the effect face changes rapidly, the illumination effects corresponding to various image special effects can be realized.

A second image special effect method of the invention is an image special effect method for adding an illumination effect using light from a light source when viewed from an arbitrary eye point in a face having a flat face and a curved face to image information concerning an input image and outputting a video signal provided by mapping the image information to the face and is a method having the steps of calculating a cosine value of the angle between an eye point direction vector indicating a vector in a direction of the eye point and a normal vector at a position of the face based on the positions of a horizontal coordinate and a vertical coordinate of the face and the shape of the face; calculating a vector having the cosine value as a component in the eye point direction and (1−cosine value) or (−1+cosine value) of the angle as a component of the horizontal coordinate as a calculation normal vector; and calculating the illumination effect based on the calculation normal vector.

According to the method, a natural illumination effect can be realized and the apparatus can be miniaturized. For example, the change amount of the horizontal direction component of the normal vector of the connection portion of the flat face part and the curved face part of page turn is found from the calculation result of the eye point direction component, whereby it can be made continuous without adding a large-scaled new calculation circuit, so that while a natural illumination effect is realized, the apparatus can be miniaturized.

Advantages of the Invention

According to the invention, if an illumination effect pattern is not previously determined and the shape of the effect face changes rapidly, the illumination effects corresponding to various image special effects can be realized.

In the illumination effect added to the image special effect of page turn like turning a page, the illumination effect to the upper flag face and the lower flat face can be canceled in response to the page turn shape and the illumination effect good in visibility can be added only to a curved face and the apparatus can be miniaturized.

Arbitrary constant A is changed in the illumination effect data depending on the page turn face, whereby the optimum illumination effect can be provided for the shading effect and the lighting effect.

The expression for calculating illumination effect data, for example, "A(2(L·N) N−2L)·V" is switched to "(2 (L·N) N−L)·V)", whereby usual illumination effect data can be calculated and the illumination effects of various image special effects can be covered widely.

For example, in the image special effect having an effect face connecting a flat face and a curved face like page turn, a natural illumination effect can also be realized by simple calculation of mathematical expression 1 with the smooth connection portion of the flat face and the curved face according to the normal vector of the display screen flat face component calculated from (1−cosine value) or (cosine value−1), and the apparatus can be miniaturized. A natural smooth shading effect can also be realized likewise.

For example, the shape is changed like page turn from the right to the left, from the left to the right, from the top to the bottom, or from the bottom to the top and the calculation result of (1−cosine value), (cosine value−1) calculated in illumination processing is reused to multiply by a constant so that the upper face and the lower face of the page turn shape do not overlap, and the upper face position is moved, so that the page turn effect to prevent the upper face and the lower face from overlapping can be realized and the apparatus can be miniaturized.

(1−cosine value) or (cosine value −1) is switched to a sine value, whereby usual normal vector can be calculated and the illumination effects of various image special effects can be covered widely.

BRIEF DESCRIPTION OF THE DRAWINGS

FIG. 21 is a drawing to show the display screen horizontal direction component normal vector characteristics in the image special effect apparatus in the related art.

Description of Reference Numerals

Figure 1:
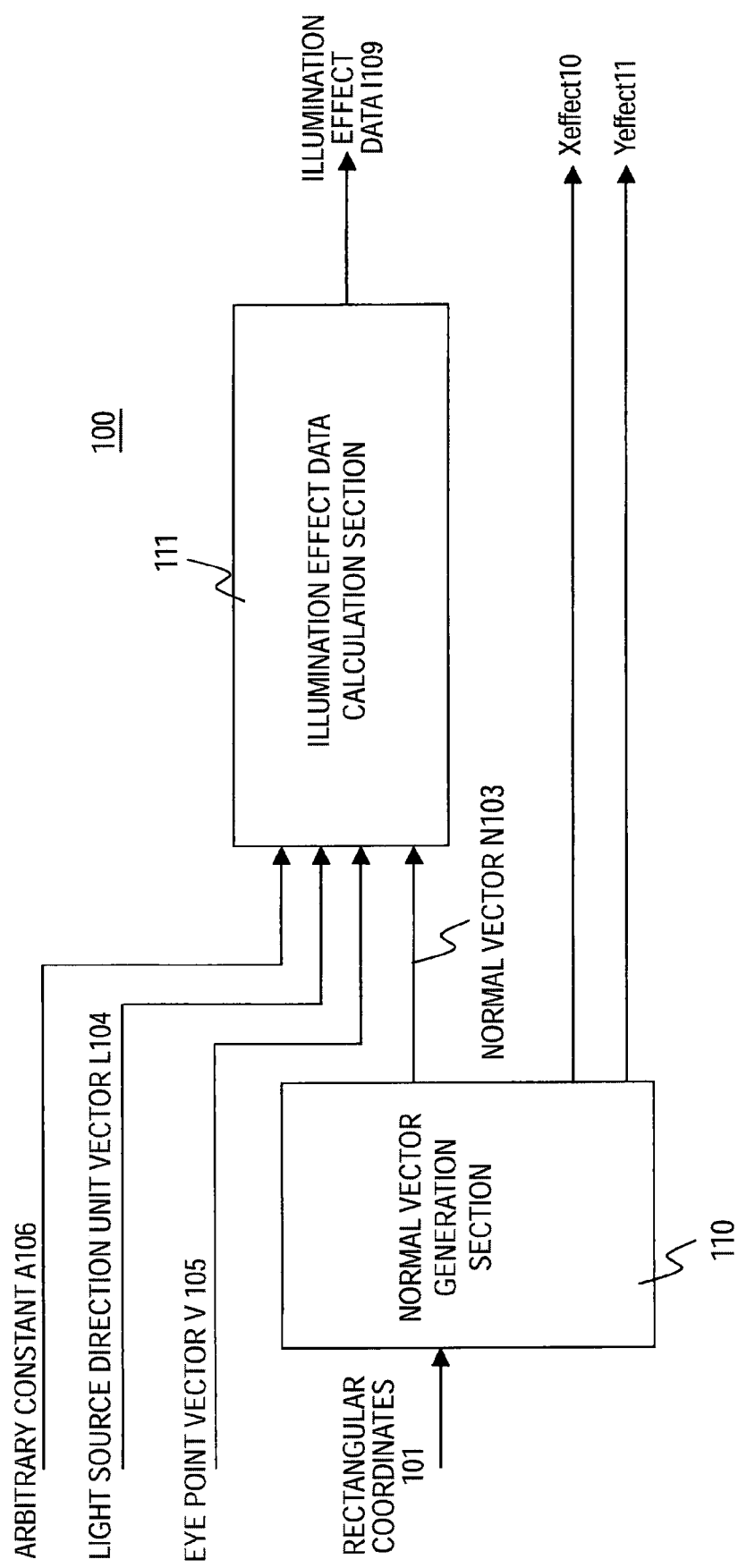
FIG. 1 is a functional block diagram to show the configuration of an image special effect apparatus in a first embodiment of the invention.

| | |
|---|---|
| 10 | Xeffect |
| 11 | Yeffect |
| 100, 600, 800, 800B, 1400, 1600 | Image effect special apparatus |
| 101 | Rectangular coordinates |
| 102 | Effect radius r |
| 103 | Normal vector N |
| 104 | Light source direction unit vector L |
| 105 | Eye point vector V |

Description of Reference Numerals -continued

| | |
|---|---|
| 106 | Arbitrary constant A |
| 108 | Mode selection signal |
| 109 | Illumination effect data I |
| 110 | Normal vector generation section |
| 111, 111B | Illumination effect data calculation section |
| 112 | Display screen horizontal direction (x axis) |
| 113 | Display screen vertical direction (y axis) |
| 114 | Eye point direction (z axis) |
| 120 | Upper flat face part |
| 121 | Upper curved face part |
| 122 | Lower flat face part |
| 123 | Lower curved face part |
| 130 | Upper flat face normal vector N |
| 131 | Upper curved face normal vector N |
| 132 | Lower flat face normal vector N |
| 133 | Lower curved face normal vector N |
| 135 | Eye |
| 140 | Upper flat face part illumination effect data I |
| 141 | Upper curved face part illumination effect data I |
| 142 | Illumination effect amplification data IA |
| 150 | Lower flat face part illumination effect data I |
| 151 | Lower curved face part illumination effect data I |
| X201 | Horizontal coordinate |
| R202 | Effect radius |
| 203 | Cosine value |
| 204, 204B | Cosine value calculation section |
| 205 | Normal vector eye point direction component |
| 206 | Normal vector horizontal direction component |
| 207, 207B | Normal vector calculation section |
| 211 | Upper curved face part |
| 212 | Upper flat face part |
| X213 | Display screen horizontal direction |
| Z214 | Eye point direction |
| 215 | Lower flat face part |
| 216 | Lower curved face part |
| 217 | Lower normal vector horizontal direction component |
| 218 | Normal vector calculation section |
| 219 | Page turn vertical coordinate calculation section |
| Y220 | Vertical coordinate |
| Y222 | Display screen vertical direction |
| 223 | Sine value |
| 224 | Mode switch signal |
| 225 | Selector |
| A231 | Uper face move amount |
| θz240 | Angle between eye point direction and normal vector |
| 250 | Sine value calculation section |
| 601 | Arbitrary constant A switch control section |
| 701 | First multiplier |
| 702 | First two-bit left shift |
| 703 | Second two-bit left shift |
| 704 | Selector |
| 705 | Second multiplier |
| 706 | Subtracter |
| 707 | Third multiplier |
| 708 | Fourth multiplier |
| 1701 | Input image |
| 1702 | Frame memory |
| 1703 | Output image |
| 1705 | Sequential write address |
| 1708 | Image special effect read address |
| 1709 | Read address computation section |

BEST MODE FOR CARRYING OUT THE INVENTION

Image special effect apparatus in embodiments of the invention will be discussed below with the accompanying drawings:

(First Embodiment)

To begin with, an image special effect apparatus in a first embodiment of the invention will be discussed.

FIG. 1 is a diagram to show the configuration of an image special effect apparatus 100 in the first embodiment of the invention. The image special effect apparatus 100 is made up of a normal vector generation section 110 and an illumination effect data calculation section 111.

The normal vector generation section 110 will be discussed with FIG. 2. Rectangular coordinates 101 indicating the positions of the horizontal coordinate and the vertical coordinate of an input image and an effect radius r102 for determining the magnitude of the effect of the turn portion of page turn are input, and a normal vector N 103 of each page turn face responsive to the position of horizontal coordinate x112 is found from a sequential display screen horizontal direction (x axis) 112 or a sequential display screen vertical direction (y axis) 113.

Figure 2:
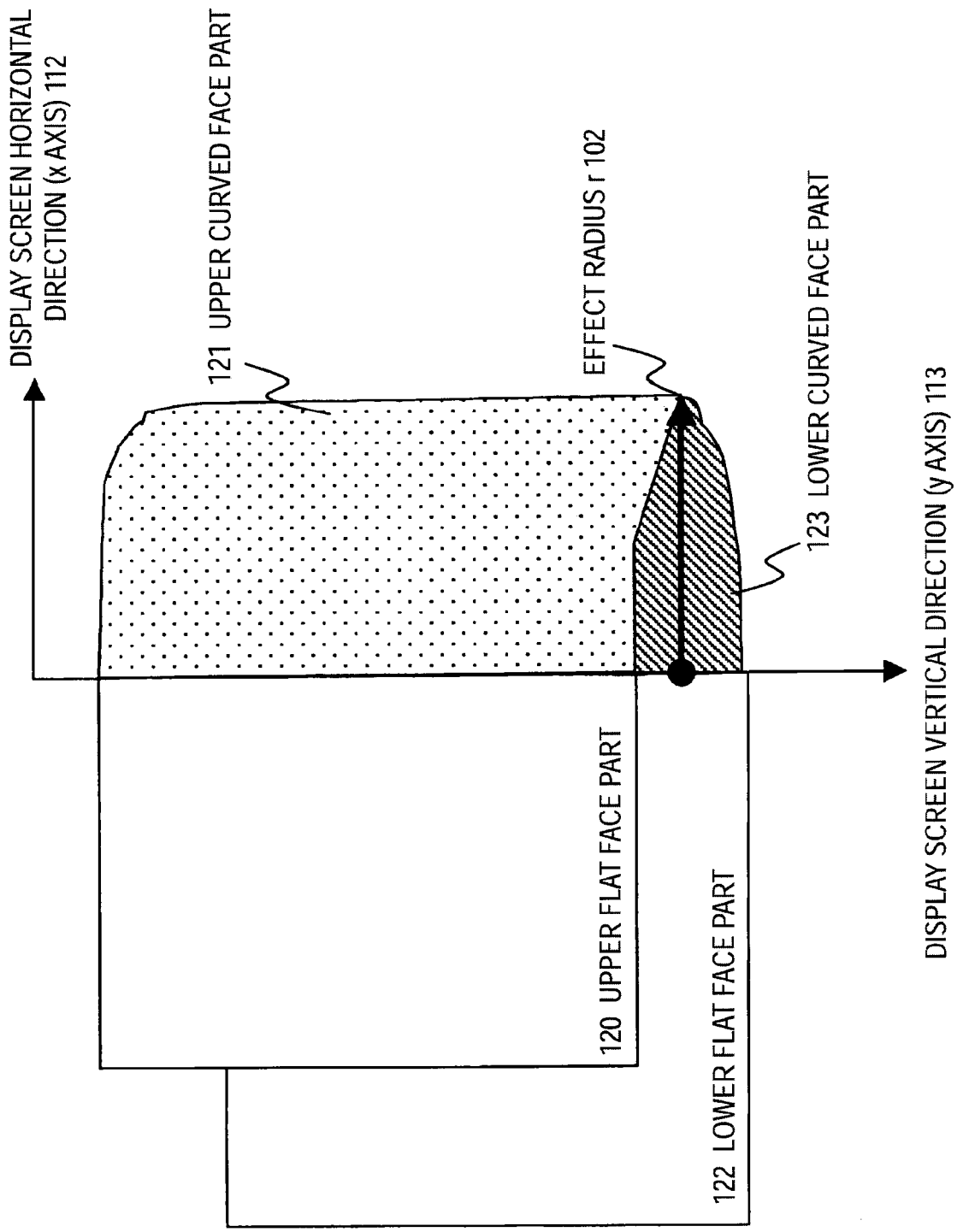
FIG. 2 is an illustration drawing of names of page turn faces of the image special effect apparatus in the first embodiment of the invention.
Figure 3:
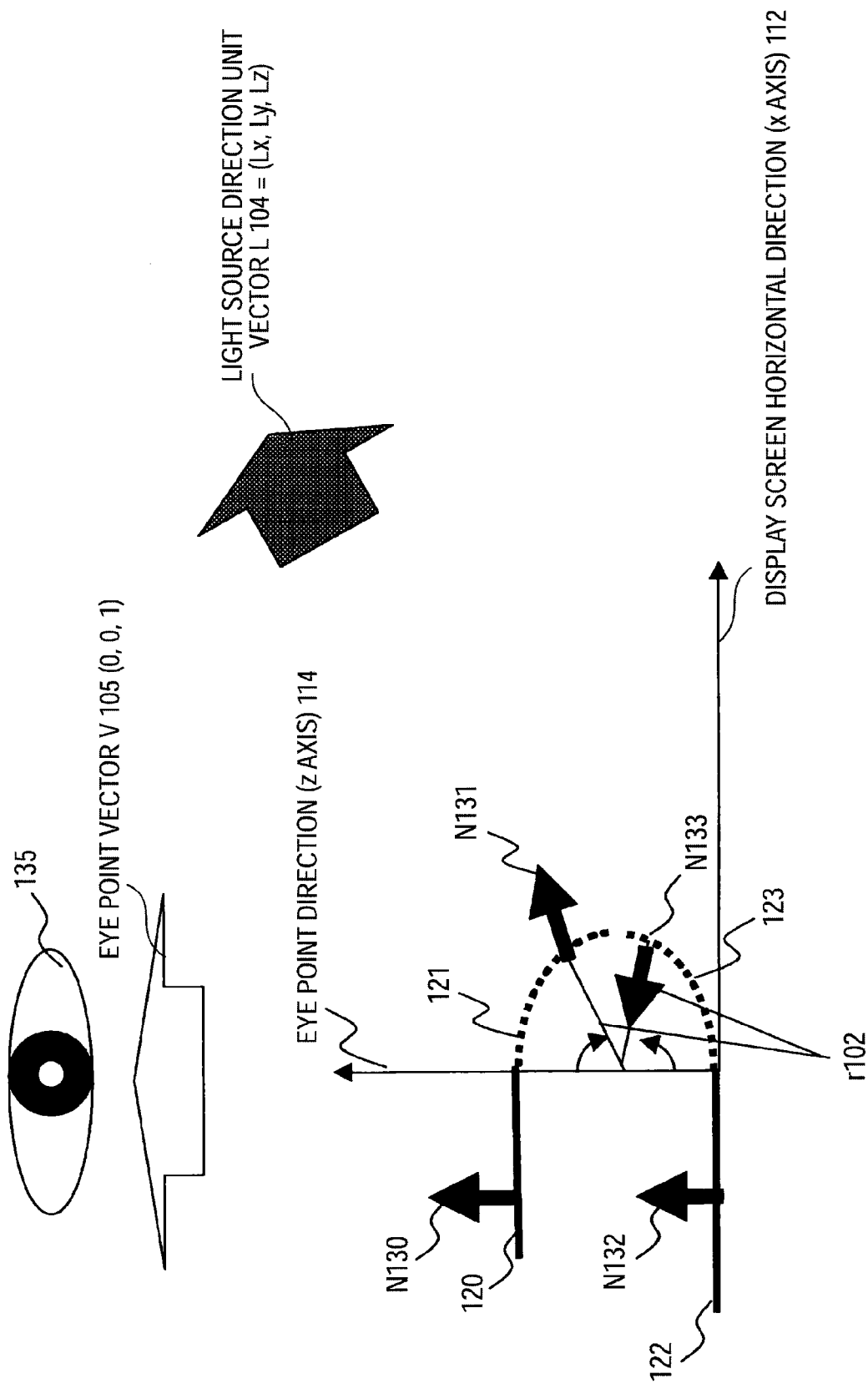
FIG. 3 is a detailed schematic representation of normal vectors in a normal vector generation section of the image special effect apparatus in the first embodiment of the invention.

The normal vectors N 103 are generated in such manner that the normal vector N 103 of an upper flat face part 120 is an upper flat face normal vector N 130=(0, 0, 1), that the normal vector N 103 of an upper curved face part 121 (in FIG. 2, dot display portion) is an upper curved face normal vector N 131, that the normal vector N 103 of a lower flat face part 122 is a lower flat face normal vector N 132=(0, 0, 1), and that the normal vector N 103 of a lower curved face part 123 (in FIG. 2, hatched display portion) is a lower curved face normal vector N 133, as shown in FIG. 3.

In FIG. 1, Xeffect 10 is display screen horizontal direction data to generate various video effects of page turn effect, ball effect, etc., computed in the normal vector generation section 110 from sequential display screen horizontal direction X112 data of the rectangular coordinates 101.

Yeffect 11 is display screen vertical direction data to generate various video effects of page turn effect, ball effect, etc., computed in the normal vector generation section 110 from sequential display screen vertical direction Y113 data of the rectangular coordinates 101.

Thus, for the image special effect, the input image data written sequentially into frame memory according to sequential write addresses is read from the frame memory according to the read address based on Xeffect 10 and Yeffect 11 computed in the normal vector 110, whereby it is made possible to add various video effects of page turn effect, ball effect, etc., to an input image.

The illumination effect data calculation section 111 generates a reflection direction vector F107 based on the normal vector N 103 generated in the normal vector generation section 110, a light source direction unit vector L 104 input from a micron, etc., an eye point vector V 105, and an arbitrary constant A 106.

After generating the reflection direction vector F107, the illumination effect data calculation section 111 calculates illumination effect data I 109 according to the following mathematical expression 2 as an illumination effect data calculation expression. Processing for calculating the illumination effect data I 109 will be discussed below: Here, the eye point vector V 105 is V, the light source direction unit vector L 104 is L, the reflection direction vector F107 is R, the normal vector N 103 is N, and the arbitrary constant A 106 is A.

$$\text{Illumination effect data } I109=(R\cdot V)\times A=((2(N\cdot L)N-2L)\cdot V)A \quad \text{mathematical expression 2}$$

To use mathematical expression 1, if the flat face normal vector is (0, 0, 1), the illumination effect data I remains and thus the illumination effect is added to the upper flat face part 120 and the upper curved face part 121 in FIG. 2, resulting in the illumination effect with no accentuation.

Then, to make it possible to set the illumination effect data at the flat face time to zero, the mathematical expression 2 with a coefficient "2" inserted just before L of the mathematical expression 1 is introduced. Accordingly, the illumination effect of the flat face part is canceled. Since the illumination effect data I of the curved face part weakens, the amplification factor of the illumination effect data I can be adjusted by adding the arbitrary constant A.

As for the mathematical expression 2, first, by setting the eye point vector V 105 for an eye 135 of a human being in FIG. 3 to (0, 0, 1), the normal vector N 103 to (Nx, Ny, Nz), the light source direction unit vector L 104 to (Lx, Ly, Lz), and the arbitrary constant A 106 to 1, the illumination effect data I 109 is found as follows. Z axis direction components of Nz, Lz, etc., are components of an eye point direction (z axis) 114.

First, when "2(N·L)" of mathematical expression 2 is expanded, "2NxLx+2NyLy+2NzLz" results and is set to "Q". At this time, if Q is assigned to mathematical expression 2, reflection vector R=(QN−2N). If the inner product of the reflection direction vector R and the eye point vector V 105 (0, 0, 1) is found as the illumination effect data I 109, the illumination effect data I 109 becomes the following mathematical expression 3:

$$\text{Illumination effect data } I109=R\cdot V=R\cdot (0, 0, 1)=Q\cdot Nz-2Lz \quad \text{mathematical expression 3}$$

The illumination effect data I 109 for each shape of the page turn effect will be discussed with FIGS. 4 and 5.

For the upper flat face part 120 and the lower flat face part 122, the normal vector N 103 indicating a flat face becomes (0, 0, 1) according to the upper flat face normal vector N 130 and the lower flat face normal vector N 132 mentioned above, Q of mathematical expression 3 becomes 2·Lz, and Nz is 1 and thus the illumination effect data I 109 becomes "0". Since the illumination effect data I 109 becomes 0 as shown in upper flat face part illumination effect data I 140 in FIG. 4 and lower flat face part illumination effect data I 150 in FIG. 5, the illumination effect is canceled.

Figure 4:
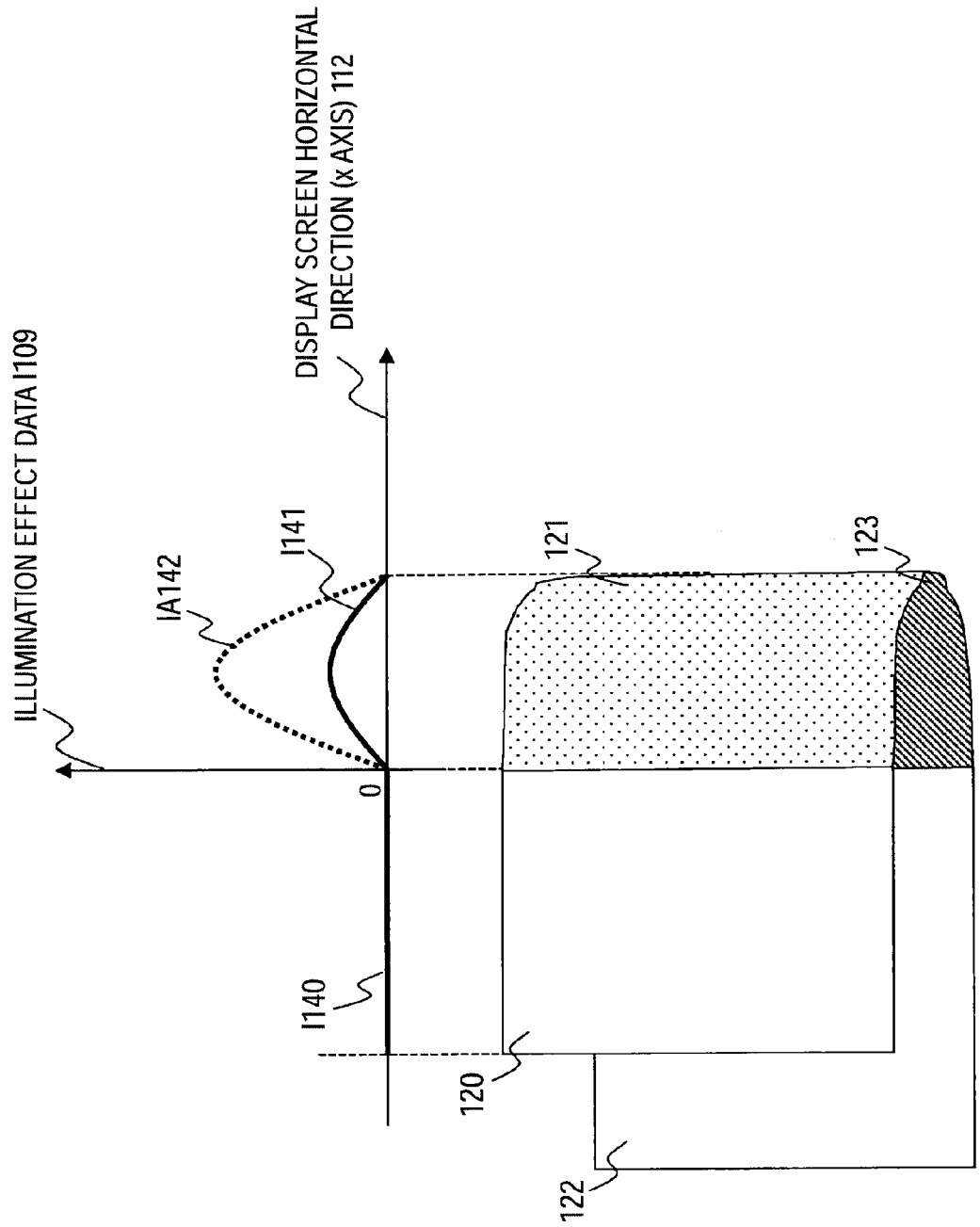
FIG. 4 is a drawing to show the characteristic of illumination effect data according to an illumination effect data calculation expression of the image special effect apparatus in the first embodiment of the invention.

For the upper curved face part 121, the illumination effect data I 109 becomes a value as shown in upper curved face part illumination effect data I 141 in FIG. 4 according to the normal vector N 131 in FIG. 3. Since the illumination effect data I 109 is larger than 0, the illumination effect of lighting is added to the upper curved face part 121. The upper curved face part illumination effect data I 141 is multiplied by the arbitrary constant A 106, whereby illumination effect data I 109 as shown in illumination effect amplification data IA 142 in FIG. 4 is generated and the illumination effect of lighting can be furthermore deepened.

Figure 5:
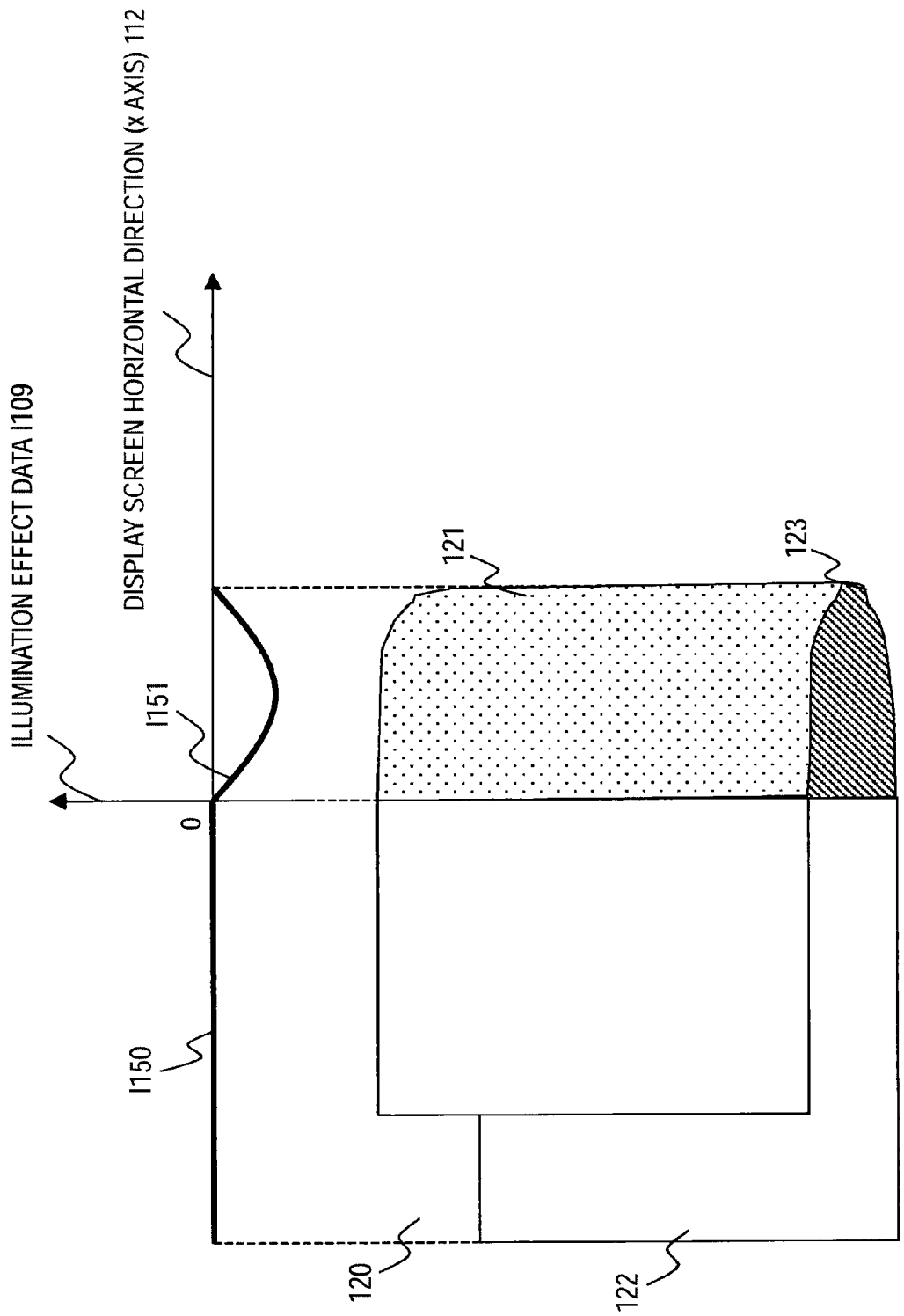
FIG. 5 is a drawing to show the characteristic of illumination effect data according to an illumination effect data calculation expression of the image special effect apparatus in the first embodiment of the invention.

For the lower curved face part 123, as the illumination effect data I 109, lower curved face part illumination effect data I 151 in FIG. 5 is obtained according to the normal vector N 133 in FIG. 3. Since the illumination effect data I 109 is smaller than 0, the illumination effect of shading is added to the lower curved face part 123. The illumination effect of shading can be furthermore deepened according to the arbitrary constant A 106.

To skip adding of the illumination effect to the upper flat face part 120, the upper curved face part 121, the lower flat face part 122, or the lower curved face part 123 of page turn, the arbitrary constant A 106 may be set to "0 (zero)".

As a result, it is made possible to add no illumination effect to the upper flat face part 120 and the lower flat face part 122, add the illumination effect of lighting to the upper curved face part 121, and add the illumination effect of shading to the lower curved face part 123 in response to the shape of the page turn in FIG. 2.

Thus, in the image special effect apparatus 100, the illumination effect good in visibility can be realized and the apparatus can be miniaturized without adding a large-scaled new calculation circuit simply by reconsidering a part of the illumination effect data calculation expression so as to make it possible to cancel the illumination effect on a flat face of the page turn effect and add the illumination effect only to a curved face.

The embodiment has been described by taking the effect of turning a page from the right to the left as a topic, but the embodiment may be applied to the page turn effect in any direction or may be applied to any special effect combining a flat face and a curved face other than the page turn effect.

The embodiment has been described with the eye point vector V 105 as (0, 0, 1), but any other direction may be adopted.

The image special effect apparatus 100 in the first embodiment of the invention is the image special effect apparatus 100 for adding an illumination effect using light from a light source when viewed from an arbitrary eye point in a face having a curved face to image information concerning an input image and outputting a video signal provided by mapping the image information to the face and has a normal vector generation section 110 for generating a normal vector indicating a vector in a normal direction at a position of the face based on rectangular coordinate data indicating the positions of a horizontal coordinate and a vertical coordinate of the face and the shape of the face; an illumination effect generation section 111 for generating reflectivity of the light in a direction of the eye point by calculation of A(2(L·N)N−2L)·V of an expression using the normal vector, a light source direction unit vector indicating a unit vector in a direction of the light source, an eye point vector V indicating a vector in the eye point direction, and an arbitrary value A; and an image information creation section for creating the image information based on the image and the reflectivity, so that if an illumination effect pattern is not previously determined and the shape of the effect face changes rapidly, the illumination effects corresponding to various image special effects can be realized. For example, in the illumination effect added to the image special effect of page turn like turning a page, the illumination effect to the upper flag face and the lower flat face can be canceled in response to the page turn shape and the illumination effect good in visibility can be added only to a curved face and the apparatus can be miniaturized.

(Second Embodiment)

Next, an image special effect apparatus in a second embodiment of the invention will be discussed.

Figure 6:
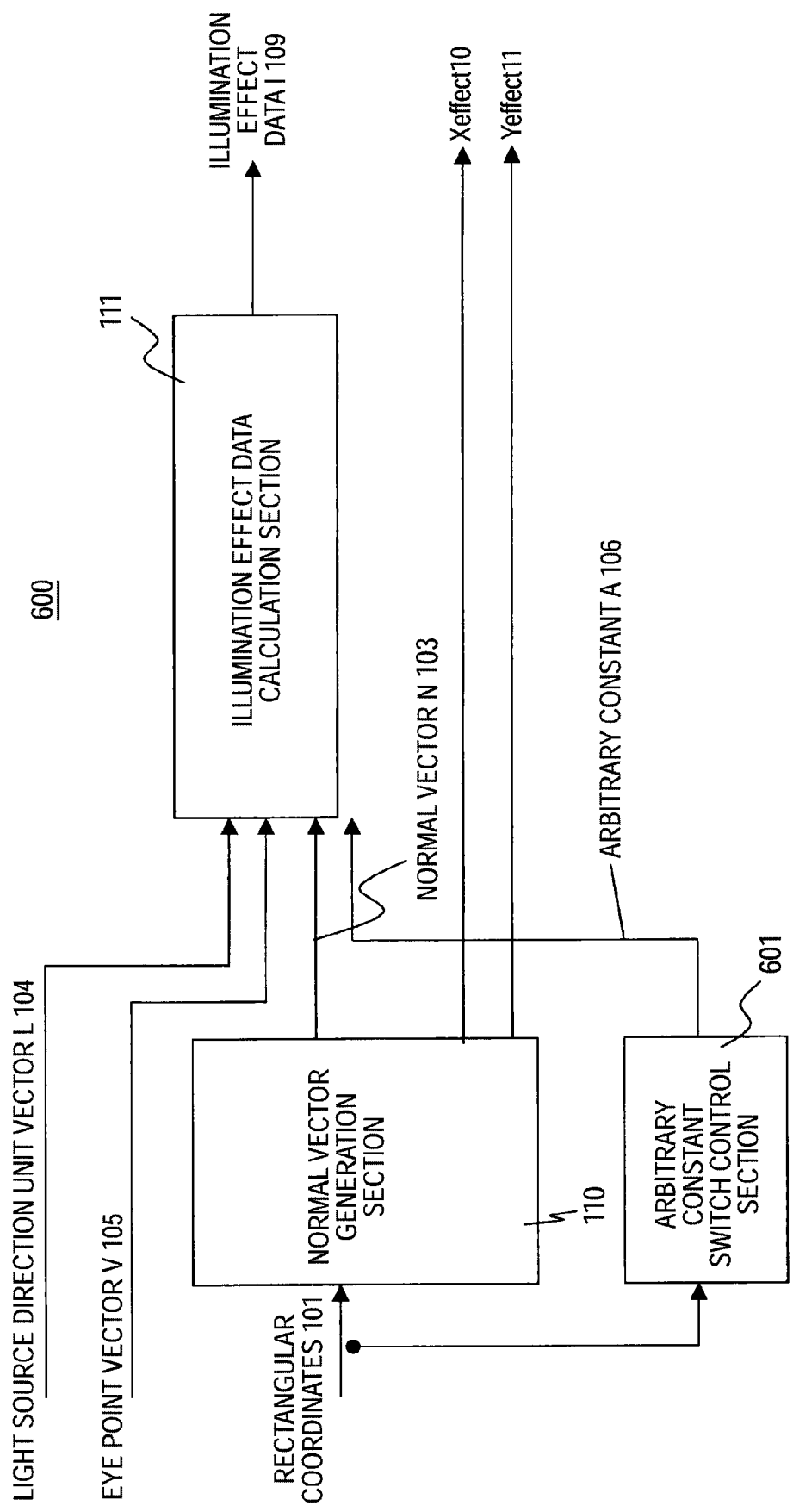
FIG. 6 is a functional block diagram to show the configuration of an image special effect apparatus in a second embodiment of the invention.

FIG. 6 is a diagram to show the configuration of an image special effect apparatus 600 in the second embodiment of the invention. The image special effect apparatus 600 has a normal vector generation section 110, an illumination effect data calculation section 111, and an arbitrary constant switch control section 601. The arbitrary constant switch control section 601 switches the value of an arbitrary constant A 106 according to the shape of a page turn face responsive to the position of horizontal coordinate x112 in FIG. 2 based on rectangular coordinates 101, and outputs the value to the illumination effect data calculation section 111. The normal vector generation section 110 and the illumination effect data calculation section 111 have similar configurations and functions to those described in the first embodiment and therefore are denoted by the same reference numerals and will not be discussed again.

For example, if the rectangular coordinates 101 correspond to the upper curved face part 121 in FIG. 2, the arbitrary constant switch control section 601 sets the value of the arbitrary constant A 106 to a coefficient to multiply illumination effect data I 109 several-fold, the illumination effect data calculation section 111 can arbitrarily adjust the illumination effect of lighting to generate the illumination effect data I 109.

In contrast, if the rectangular coordinates 101 correspond to the lower curved face part 123 in FIG. 2, the arbitrary constant switch control section 601 sets the value of the arbitrary constant A 106 to a coefficient to set the illumination effect data I 109 to less than 0, the illumination effect data calculation section 111 can arbitrarily adjust the illumination effect of shading to generate the illumination effect data I 109.

The image special effect apparatus 600 in the second embodiment of the invention has the arbitrary constant switch control section 601 capable of changing the arbitrary value A, so that it is made possible to adjust the illumination effect responsive to lighting or shading processing for a specific portion of page turn and the illumination effect good in visibility can be realized without adding a large-scaled new calculation circuit and the image special effect apparatus can be miniaturized.

(Third Embodiment)

Next, an image special effect apparatus in a third embodiment of the invention will be discussed.

Figure 7:
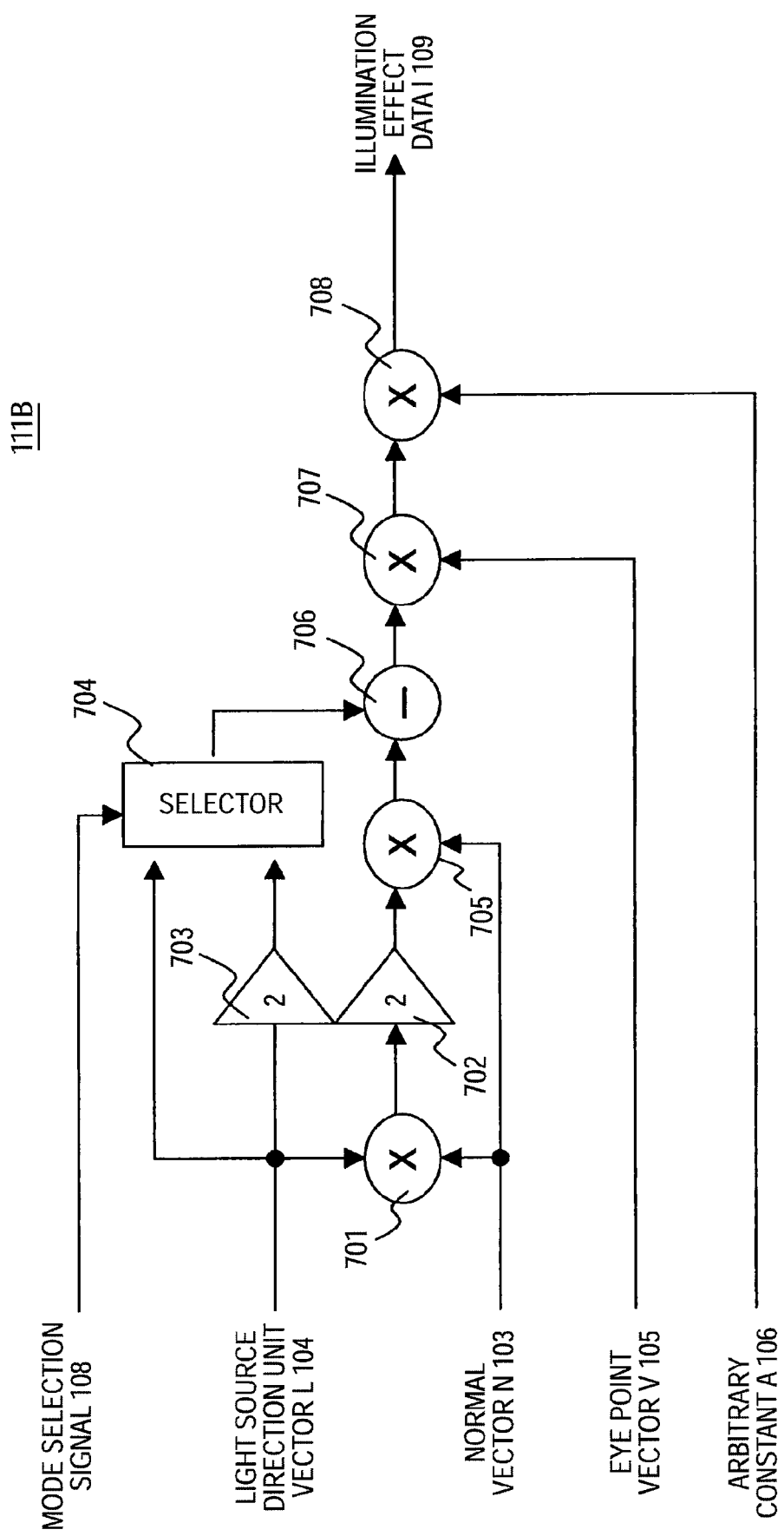
FIG. 7 is a functional block diagram to show the configuration of an illumination effect data calculation section of an image special effect apparatus in a third embodiment of the invention.

An image special effect apparatus 700 in the third embodiment of the invention has a similar configuration to that of the image special effect apparatus 100 in the second embodiment of the invention or the image special effect apparatus 600 in the first embodiment of the invention except for the illumination effect data calculation section 111 although a block diagram of the general configuration of the apparatus is not presented. In the third embodiment, the image special effect apparatus 700 has an illumination effect data calculation section 111B in place of the illumination effect data calculation section 111. The illumination effect data calculation section 111B receives a mode selection signal to select one from among illumination effect data I computation expressions from a control section not shown and selects one of the illumination effect data computation expressions I. FIG. 7 is a diagram to show the configuration of the illumination effect data calculation expression 111B of the special effect apparatus in the third embodiment of the invention.

The illumination effect data calculation section 111B has a first multiplier 701, a first one-bit left shifter 702, a second one-bit left shifter 703, a selector 704, a second multiplier 705, a subtracter 706, a third multiplier 707, and a fourth multiplier 708.

The first multiplier 701 inputs a light source direction unit vector L 104 and a normal vector N 103 and outputs the computation result to the first one-bit left shifter 702. The first one-bit left shifter 702 inputs the computation result of the first multiplier 701 and outputs the computation result to the second multiplier 705. The second one-bit left shifter 703 inputs the light source direction unit vector L 104 and outputs the computation result to the selector 704.

The selector 704 inputs a mode selection signal 108, the light source direction unit vector L 104, and the computation result of the second one-bit left shifter 703, and outputs the result to the subtracter 706 based on the mode selection signal 108.

The second multiplier 705 inputs the computation result of the first one-bit left shifter 702 and outputs the computation result to the subtracter 706. The subtracter 706 inputs the computation result of the selector 704 and the computation result of the second multiplier 705 and outputs to the third multiplier 707. The third multiplier 707 inputs the computation result of the subtracter 706 and an eye point vector V 105 and outputs the computation result to the fourth multiplier 708. The fourth multiplier 708 inputs the computation result of the third multiplier 707 and an arbitrary constant A 106 and outputs illumination effect data I 109.

In FIG. 7, two illumination effect data I computation expressions are possible depending on whether or not the light source direction unit vector L 104 is through the second one-bit left shifter 703; if the vector is through the second one-bit left shifter 703, the illumination effect data I computation expression is the same as mathematical expression 1 in the related art if arbitrary constant A 106=1; if the vector is not through the second one-bit left shifter 703, the illumination effect data I computation expression is the same as mathematical expression 2 described in the first embodiment of the invention.

That is, the second one-bit left shifter 703 and the selector 704 are added to the configuration for implementing the illumination effect data I calculation expression shown in mathematical expression 1 in the related art, and the selector 704 can switch between the illumination effect data I calculation expression in the related art shown as mathematical expression 1 and the illumination effect data I calculation expression of the image special effect apparatus 100 described in the first embodiment shown as mathematical expression 2 according to the mode selection signal 108.

In the third embodiment, the switching configuration between the two illumination effect data I computation expressions is introduced with FIG. 7, but the number of the computation expressions is not limited to two and the apparatus may have a configuration for making it possible to implement more than two computation expressions.

According to the image special effect apparatus 700 in the third embodiment of the invention, the illumination effect data calculation section 111B has a plurality of candidates for the generated reflectivity and generates one reflectivity from among the plurality of candidates, so that simply by adding the simple combination of the second one-bit left shifter 703 and the selector 704 without adding a large-scaled new calculation circuit, it is made possible to switch a plurality of types of illumination effect data calculation expressions and the illumination effect in any other image special effect than the page turn effect, such as ball effect can be calculated in a general-purpose manner and the image special effect apparatus can be miniaturized.

(Fourth Embodiment)

Next, the illumination effect of an upper face in page turn effect will be discussed.

Figure 8:
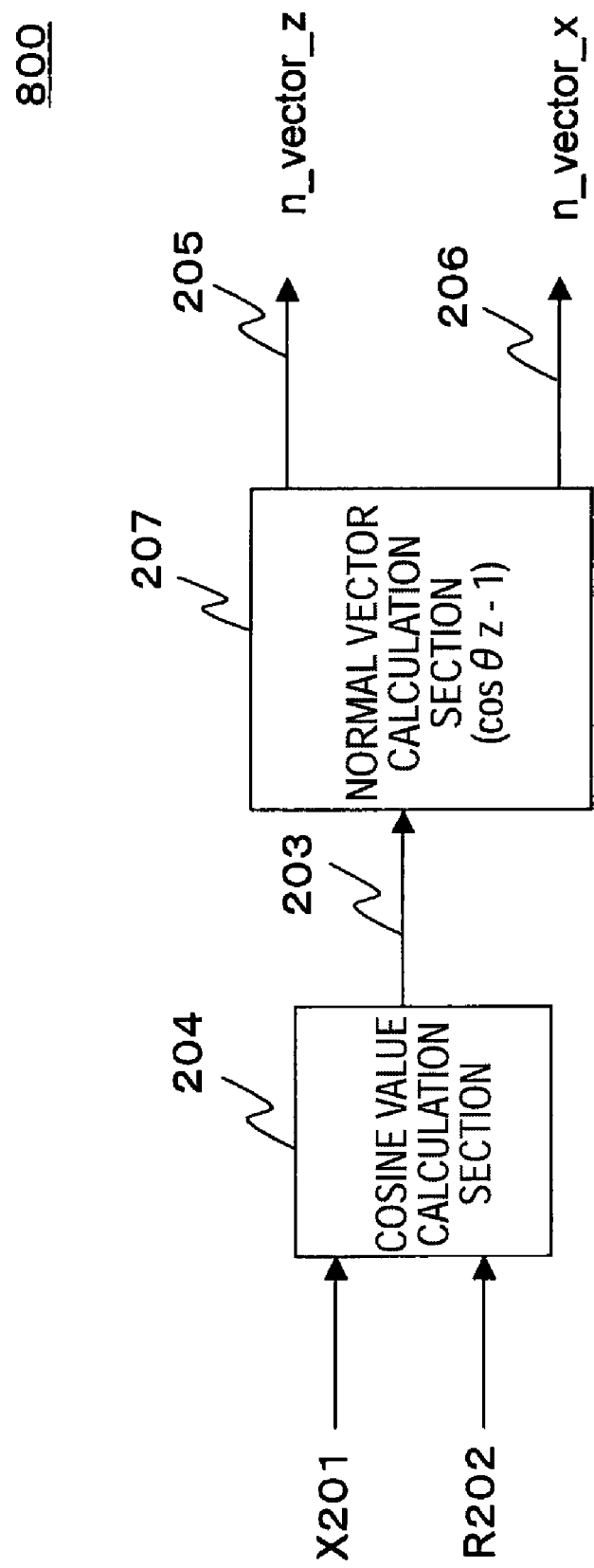
FIG. 8 is a block diagram to show the configuration of an image special effect apparatus in a fourth embodiment of the invention.

FIG. 8 is a diagram to show the configuration of an image special effect apparatus 800 in a fourth embodiment of the invention. The image special effect apparatus 800 has a cosine value calculation section 204 and a normal vector calculation section 207. The cosine value calculation section 204 inputs a horizontal coordinate 201 ($x$) (X201 in FIG. 8) and an effect radius 202 ($r$) (R202 in FIG. 8) and finds a cosine value 203 (cos θz) according to the following expression:

$$\sqrt{1 - \frac{x^2}{r^2}} \qquad \text{Expression 3}$$

The normal vector calculation section 207 inputs the cosine value 203 (cos θz) of the calculation result of the cosine value calculation section 204 and outputs a normal vector horizontal direction component 206 and a normal vector eye point direction component 205.

Here, letting the horizontal direction component 206 of a normal vector for realizing the illumination effect of an upper face in page turn effect be n_vector_x and the eye point direction component 205 of the normal vector be n_vector_z, normal vector N=(n_vector_x, 0, n_vector_z). The normal vector calculation section 207 outputs the cosine value 203 (cos θz) of the calculation of the cosine value calculation section 204 like the input value as n_vector_z. The normal vector calculation section 207 calculates n_vector_x as n_vector_x=1−cos θz using the calculation result of n_vector_z.

At this time, the normal vector N of an upper curved face part 211 becomes the following expression:

$$N = (1 - \cos\theta_z, 0, \cos\theta_z) \qquad \text{Expression 4}$$

$$= \left(1 - \sqrt{1 - \frac{x^2}{r^2}}, 0, \sqrt{1 - \frac{x^2}{r^2}}\right)$$

Figure 10:
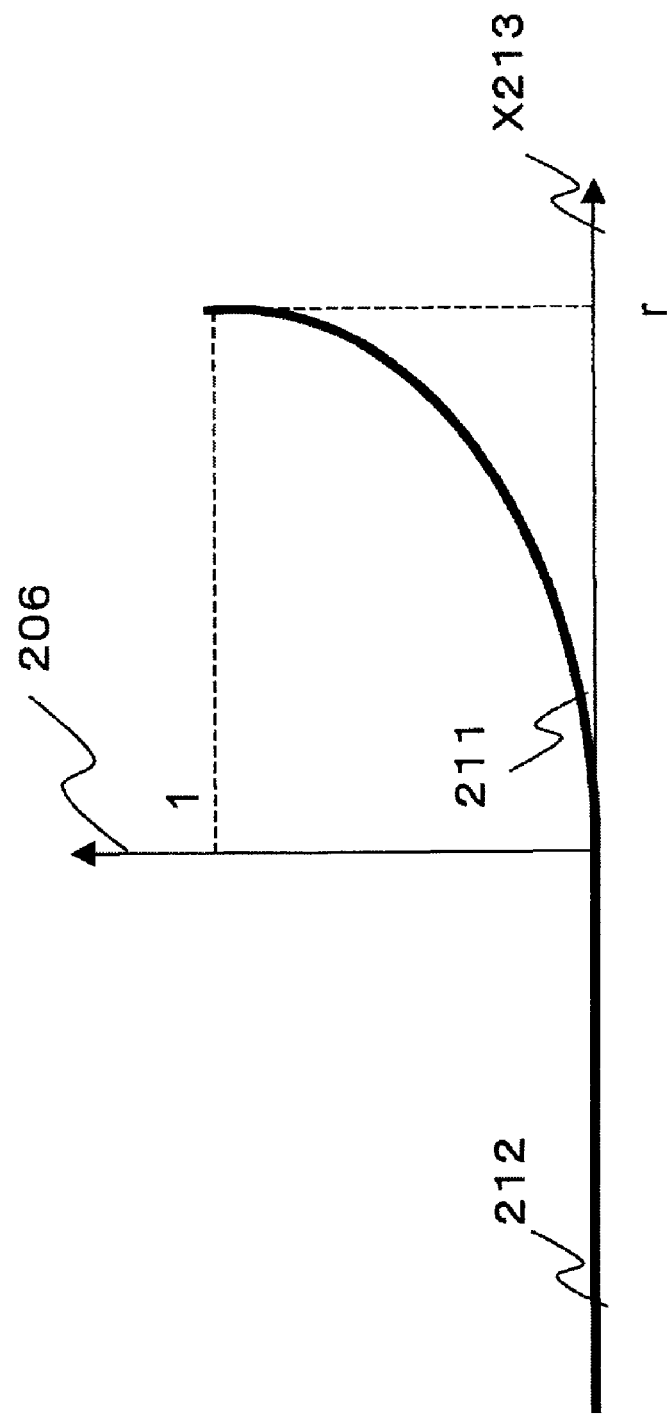
FIG. 10 is a drawing to show the horizontal direction component normal vector characteristic in the fourth embodiment of the invention.

The normal vector N of an upper flat face part 211 becomes N=(0, 0, 1) and as the characteristic of n_vector_x, the change amount becomes continuous in the connection portion of the upper curved face part 211 and the upper flat face part 212 as shown in FIG. 10.

Figure 9:
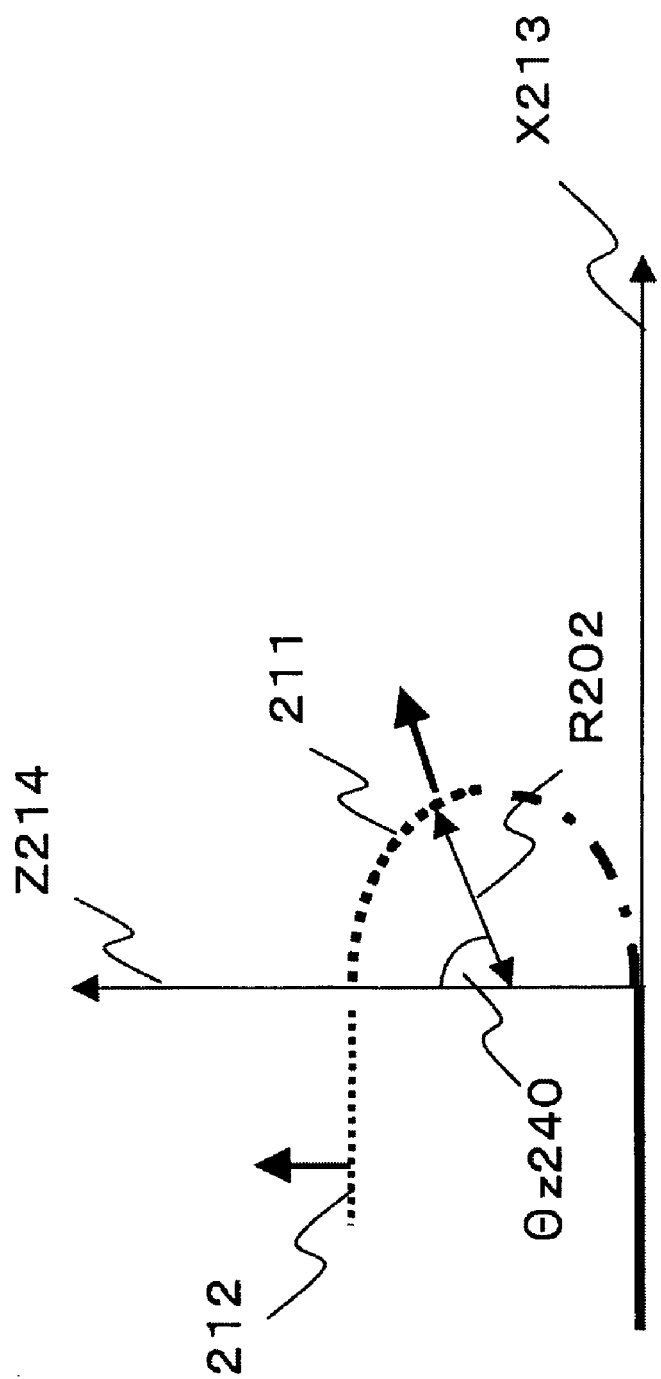
FIG. 9 is a detailed schematic representation of normal vectors in the fourth embodiment of the invention.

FIG. 9 is a detailed schematic representation of normal vectors in the fourth embodiment of the invention; the directions of thick arrows in the upper flat face part 212 and the upper curved face part 211 indicate the directions of normal vectors. FIG. 10 is a drawing to show the horizontal direction component normal vector characteristic in the fourth embodiment of the invention.

Consequently, the illumination effect in the connection portion of the upper curved face part 211 and the upper flat face part 212, of the page turn effect as in FIG. 9 can continuously change and a visually natural illumination effect can also be obtained.

Next, the illumination effect of a lower face in the page turn effect will be discussed.

Figure 11:
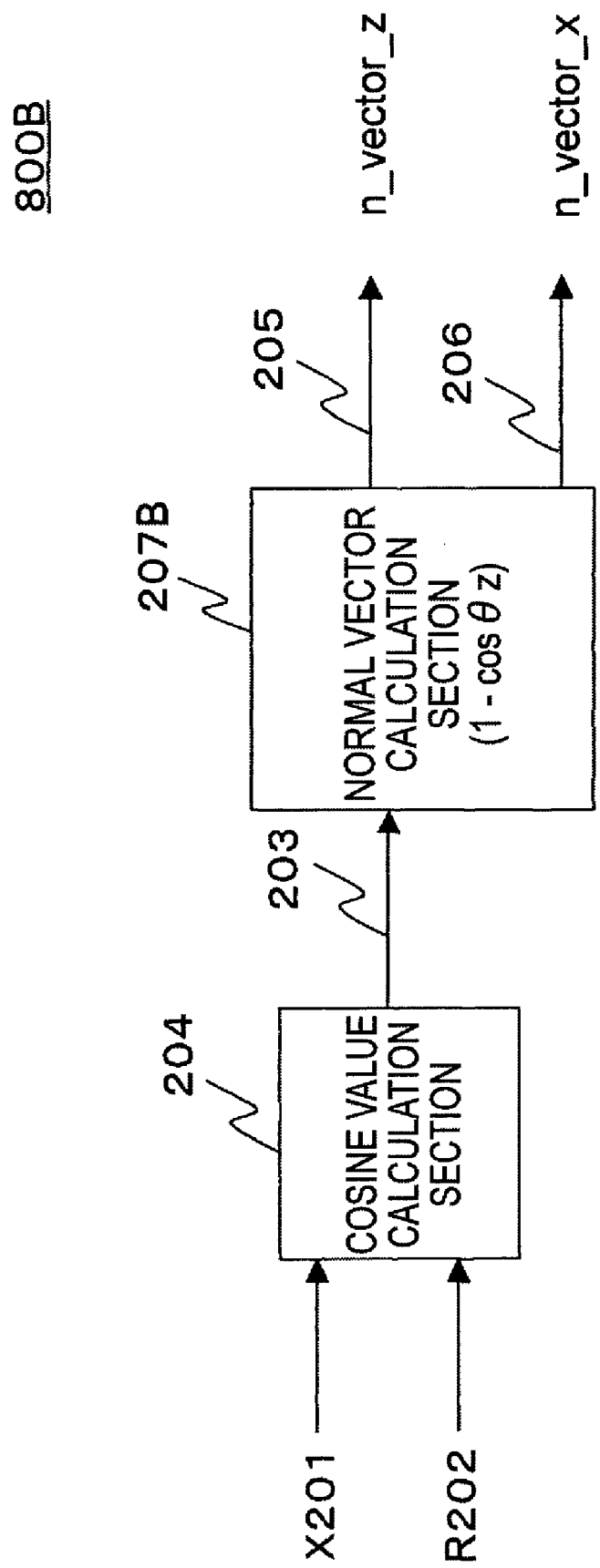
FIG. 11 is a block diagram to show the configuration of a second image special effect apparatus in the fourth embodiment of the invention.

FIG. 11 is a diagram to show the configuration of a second image special effect apparatus 800B in the fourth embodiment of the invention. Basically, the image special effect apparatus 800B has a similar configuration to that of the image special effect apparatus 800 shown in FIG. 8, but has a normal vector calculation section 207B in place of the normal vector calculation section 207.

The normal vector calculation section 207B finds n_vector_z in a similar manner to that in FIG. 8. It calculates n_vector_x of a lower curved face part 216 as n_vector_x=cos θz−1 using the calculation result of n_vector_z.

At this time, the normal vector N of the lower curved face part 216 becomes the following expression:

$$N = (\cos\theta_z - 1, 0, \cos\theta_z) \qquad \text{Expression 5}$$

$$= \left(\sqrt{1 - \frac{x^2}{r^2}} - 1, 0, \sqrt{1 - \frac{x^2}{r^2}}\right)$$

Figure 13:
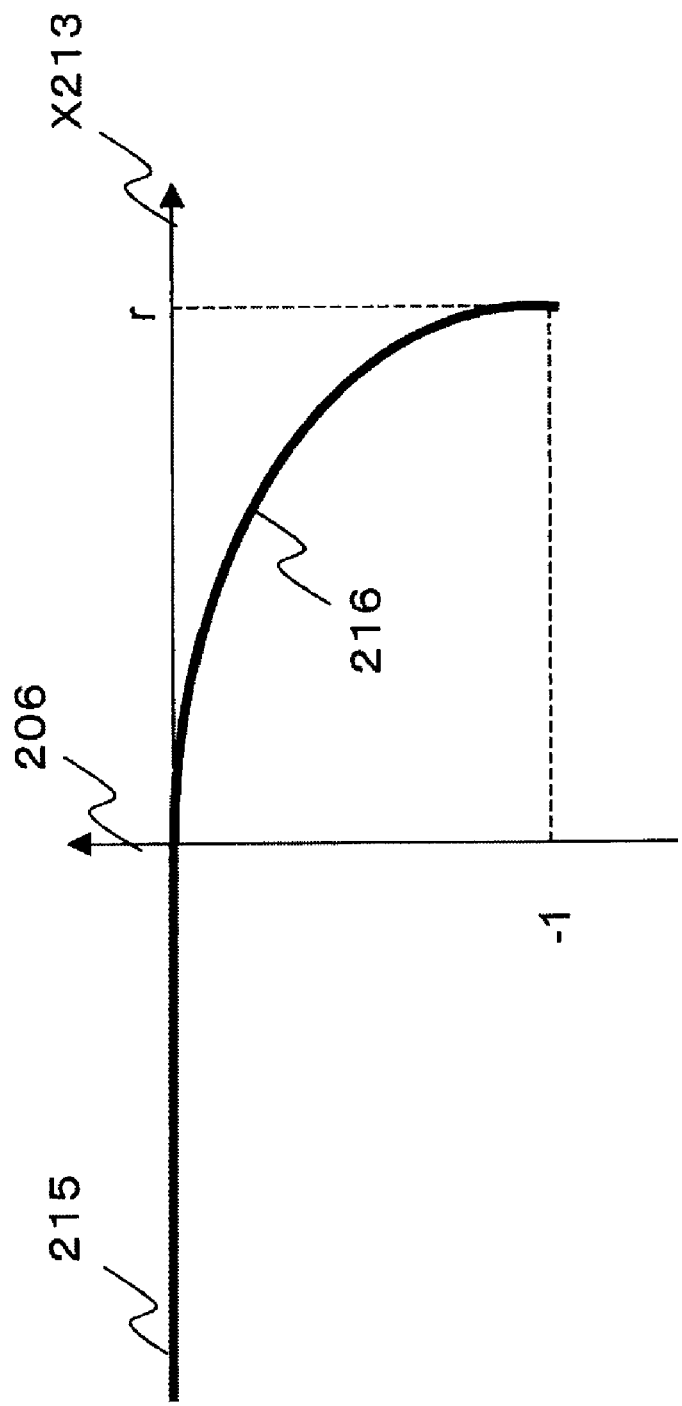
FIG. 13 is a drawing to show the second horizontal direction component normal vector characteristic in the fourth embodiment of the invention.

The normal vector N of a lower flat face part 215 becomes N=(0, 0, 1) and as the characteristic of n_vector_x, the change amount becomes continuous in the connection portion of the lower curved face part 216 and the lower flat face part 215 as shown in FIG. 13.

Figure 12:
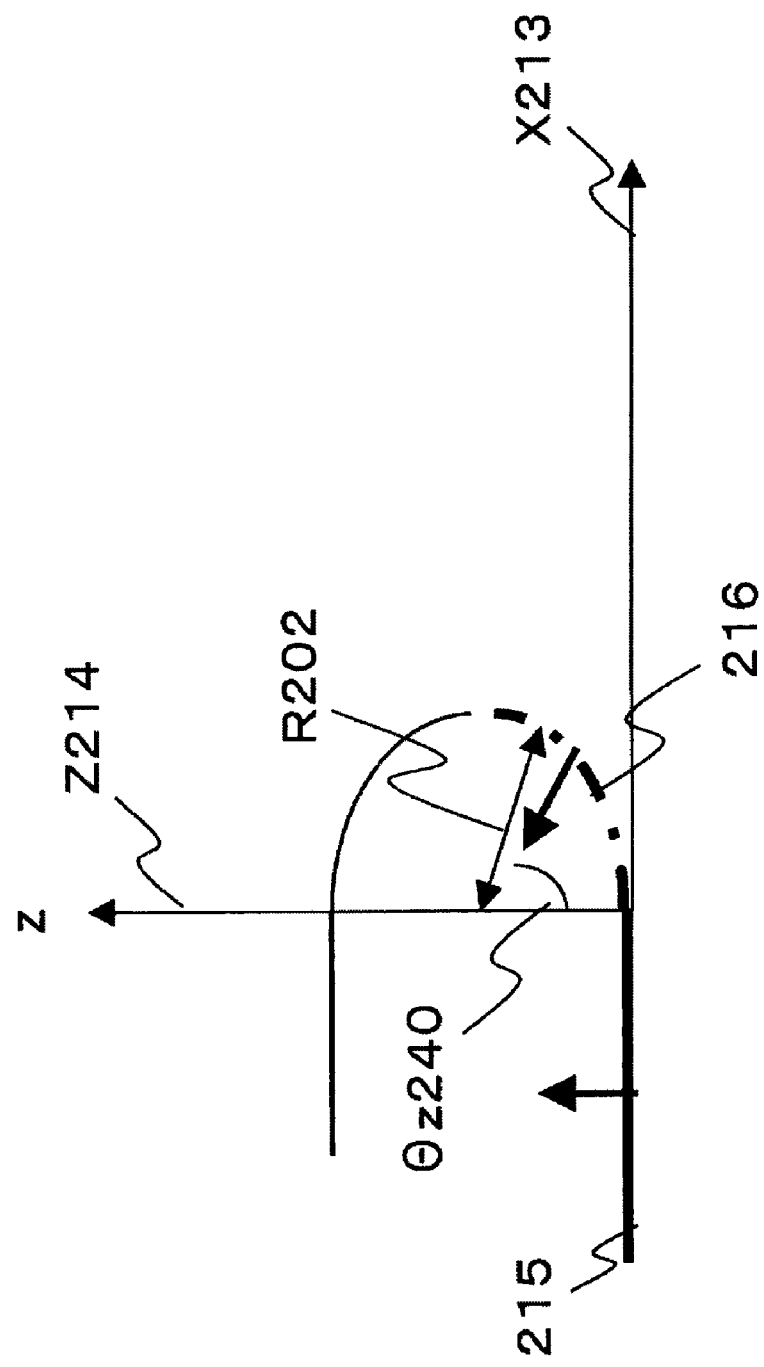
FIG. 12 is a second detailed schematic representation of normal vectors in the fourth embodiment of the invention.

FIG. 12 is a second detailed schematic representation of normal vectors in the fourth embodiment of the invention; the directions of thick arrows in the lower flat face part 215 and the lower curved face part 216 indicate the directions of normal vectors. FIG. 13 is a drawing to show the second horizontal direction component normal vector characteristic in the fourth embodiment of the invention.

Consequently, the illumination effect in the connection portion of the lower flat face part 215 and the lower curved face part 216, of the page turn effect as in FIG. 12 can continuously change and a visually natural illumination effect can also be obtained.

The image special effect apparatus 800 in the fourth embodiment of the invention is the image special effect apparatus 800 for adding an illumination effect using light from a light source when viewed from an arbitrary eye point in a face having a flat face and a curved face to image information concerning an input image and outputting a video signal provided by mapping the image information to the face and has a cosine value calculation section 204 for calculating a cosine value of the angle between an eye point direction vector indicating a vector in a direction of the eye point and a normal vector at a position of the face based on the positions of a horizontal coordinate and a vertical coordinate of the face and the shape of the face; a normal vector calculation section 207 for calculating a vector having the cosine value as a component in the eye point direction and (1−cosine value) or (−1+cosine value) of the angle as a component of the horizontal coordinate as a calculation normal vector; and an illumination effect calculation section for calculating the illumination effect based on the calculation normal vector, so that, for example, the change amount of the horizontal direction component of the normal vector N of the connection portion of the flat face part and the curved face part of page turn is found from the calculation result of the eye point direction component, whereby it can be made continuous without adding a large-scaled new calculation circuit, so that while a natural illumination effect is realized, the apparatus can be miniaturized.

The embodiment has been described as the effect of turning a page in the horizontal direction, but the direction may be any other direction, in which case the vertical direction component of the normal vector may be considered like the horizontal direction component.

The embodiment has been described by taking the page turn effect as a topic, but the embodiment may be applied to the image special effect of connecting a flat face and a curved face or a curved face and a curved face.

(Fifth Embodiment)

Next, an image special effect apparatus 1400 in a fifth embodiment of the invention will be discussed.

Figure 14:
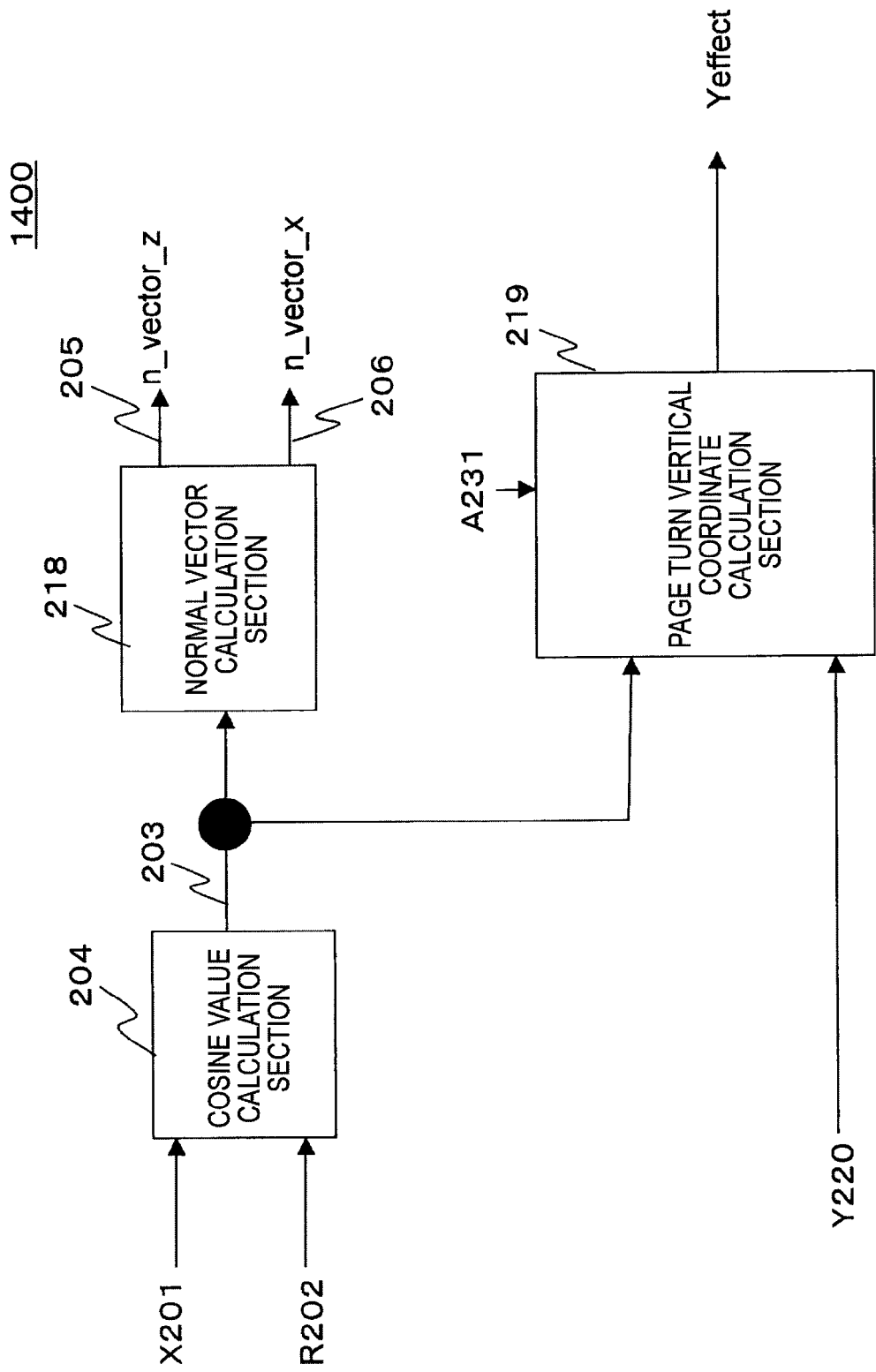
FIG. 14 is a block diagram to show the configuration of an image special effect apparatus in a fifth embodiment of the invention.

FIG. 14 is a diagram to show the configuration of the image special effect apparatus 1400 in the fifth embodiment of the invention. The image special effect apparatus 1400 has a cosine value calculation section 204, a normal vector calculation section 218, and a page turn vertical coordinate calculation section 219. The page turn vertical coordinate calculation section 219 is an example of a part of normal vector calculation section.

The cosine value calculation section 204 is similar to that described in the fourth embodiment. The normal vector calculation section 218 has a similar function to that of the normal vector calculation section 207 or the normal vector calculation section 207B in the fourth embodiment.

Figure 15:
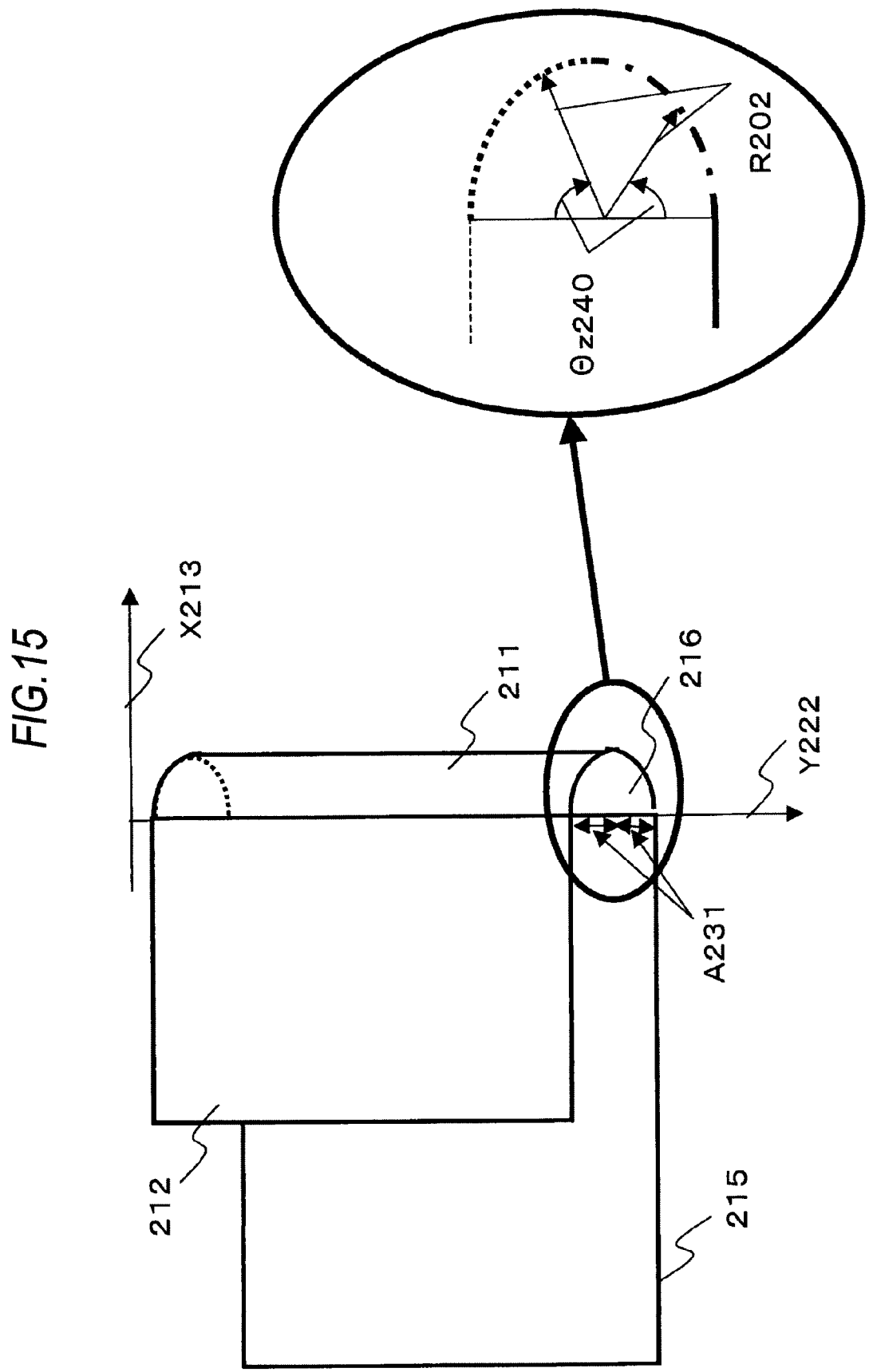
FIG. 15 is a drawing to describe the page turn effect vertical coordinate calculation specifications in the fifth embodiment of the invention.

For illumination processing normal vector calculation, the page turn vertical coordinate calculation section 219 executes calculation to find Yeffect using a cosine value 203 (cos θz) calculated by the cosine value calculation section 204, an upper face move amount 231 (a) (A31 in FIG. 14) indicating the position shift amount of an upper face and a lower face, and a vertical coordinate 220 (y) (Y20 in FIG. 14). The calculation to calculate Yeffect, namely, the calculation performed by the page turn vertical coordinate calculation section 219 is shown as in the following expressions for each of a lower flat face part 215, a lower curved face part 216, an upper curved face part 211, and an upper flat face part 212. FIG. 15 is a drawing to describe the page turn effect vertical coordinate calculation specifications in the fifth embodiment of the invention.

(Lower flat face part 215) Yeffect=y
(Lower curved face part 216) Yeffect=y−a {1−cos θz}
(Upper curved face part 211) Yeffect=y−a {1+cos θz}
(Upper flat face part 212) Yeffect=y−2a According to the image special effect apparatus 1400 in the fifth embodiment of the invention, if the shape is a page turn shape having an upper face and a lower face, the page turn vertical coordinate calculation section 219 calculates a component of a vertical coordinate of the calculation normal vector based on the cosine value calculated by the cosine value calculation section 204, the position of the vertical coordinate, and an upper face move amount based on the position shift amount of the upper face and the lower face in the vertical direction, so that cos θz already calculated for normal vector calculation is used for calculation in the vertical coordinate direction of page turn, whereby, for example, the upper face and the lower face do not overlap in shape change of turning a page from the right to the left and a natural page turn effect is provided without adding a large-scaled new calculation circuit and the apparatus can be miniaturized.

The embodiment has been described as the effect of turning a page from the right to the left, but the direction may be any other direction from the left to the right, from the top to the bottom, or from the bottom to the top.

(Sixth Embodiment)

Next, an image special effect apparatus 1600 in a sixth embodiment of the invention will be discussed.

Figure 16:
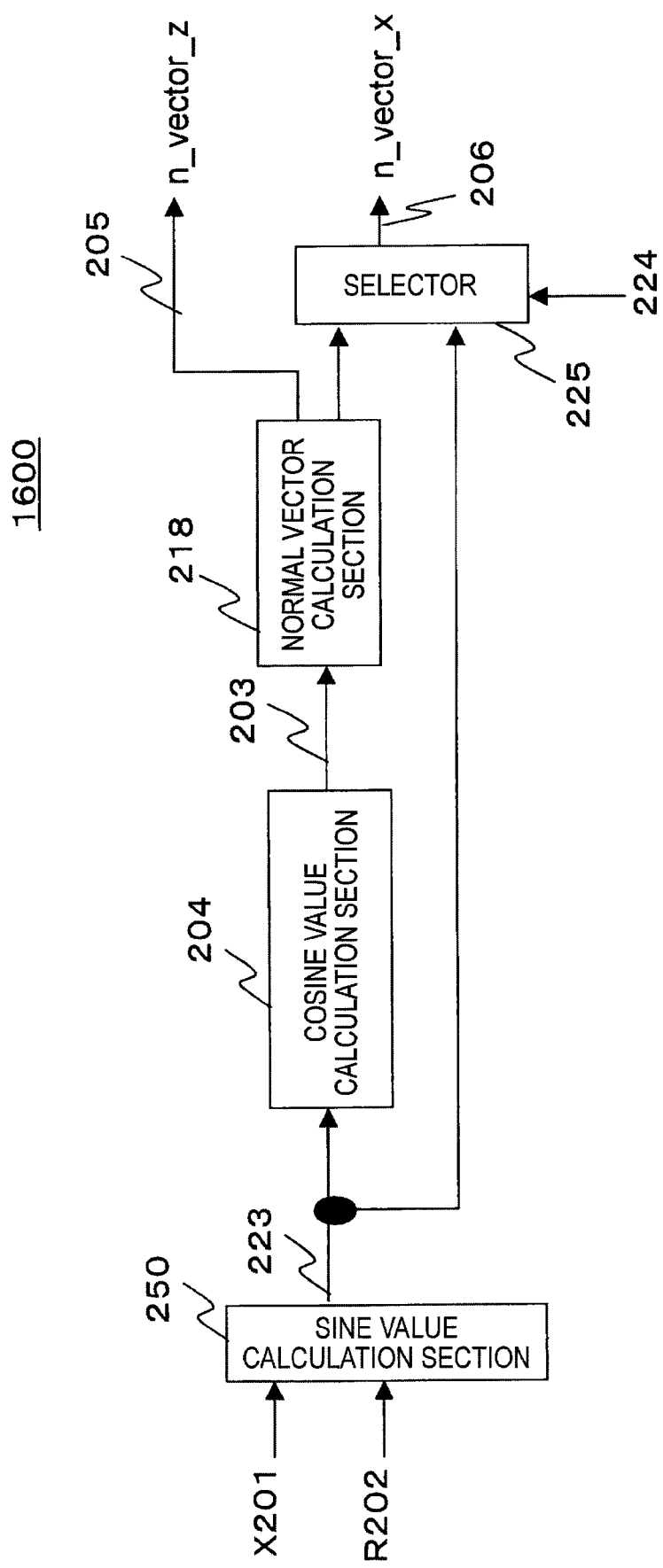
FIG. 16 is a block diagram to show the configuration of an image special effect apparatus in a sixth embodiment of the invention.
Figure 17:
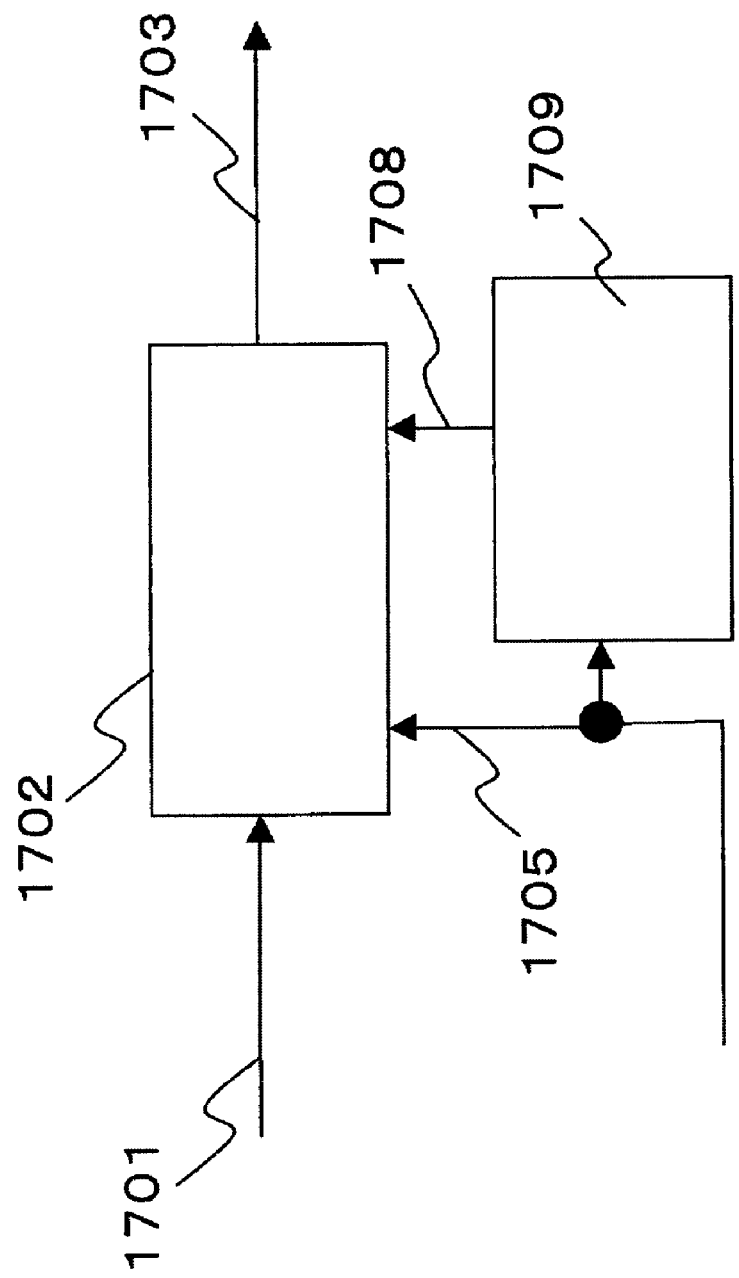
FIG. 17 is a block diagram to show the configuration of an image special effect apparatus in a related art.
Figure 18:
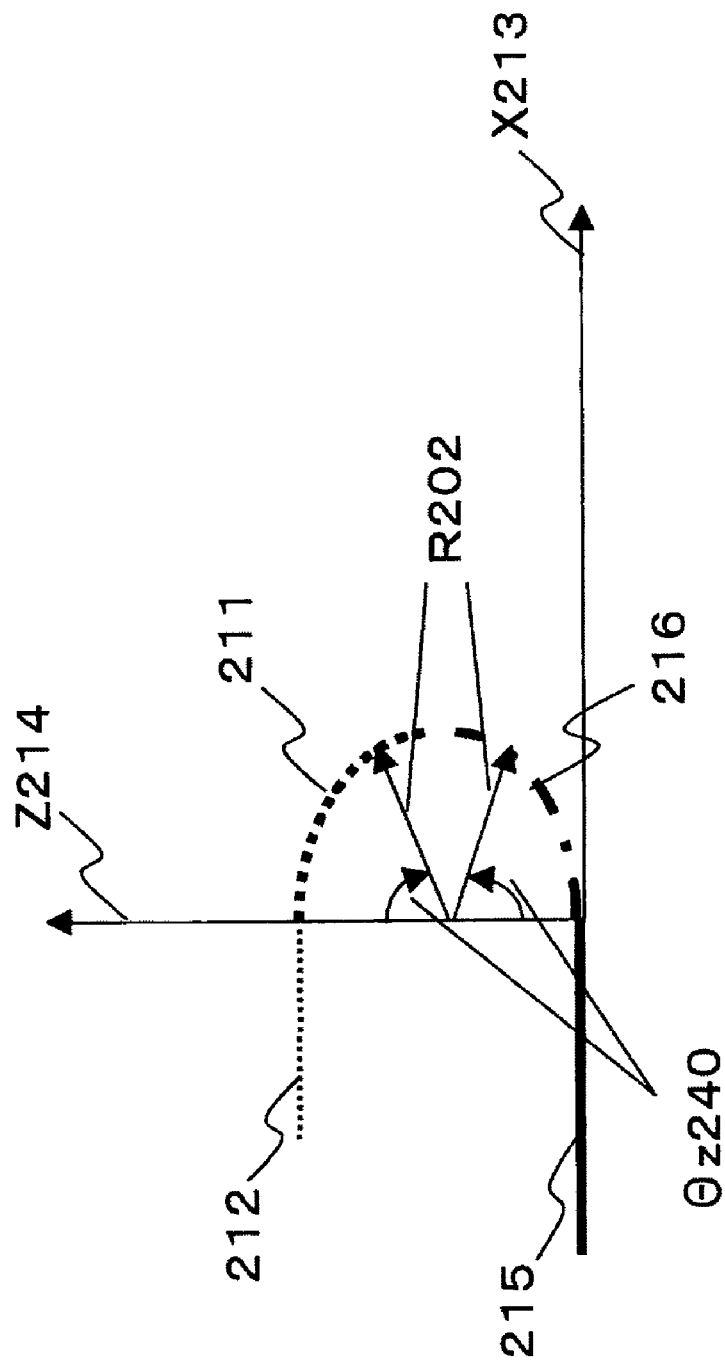
FIG. 18 is a drawing to describe the horizontal coordinate calculation specifications in the image special effect apparatus in the related art.
Figure 19:
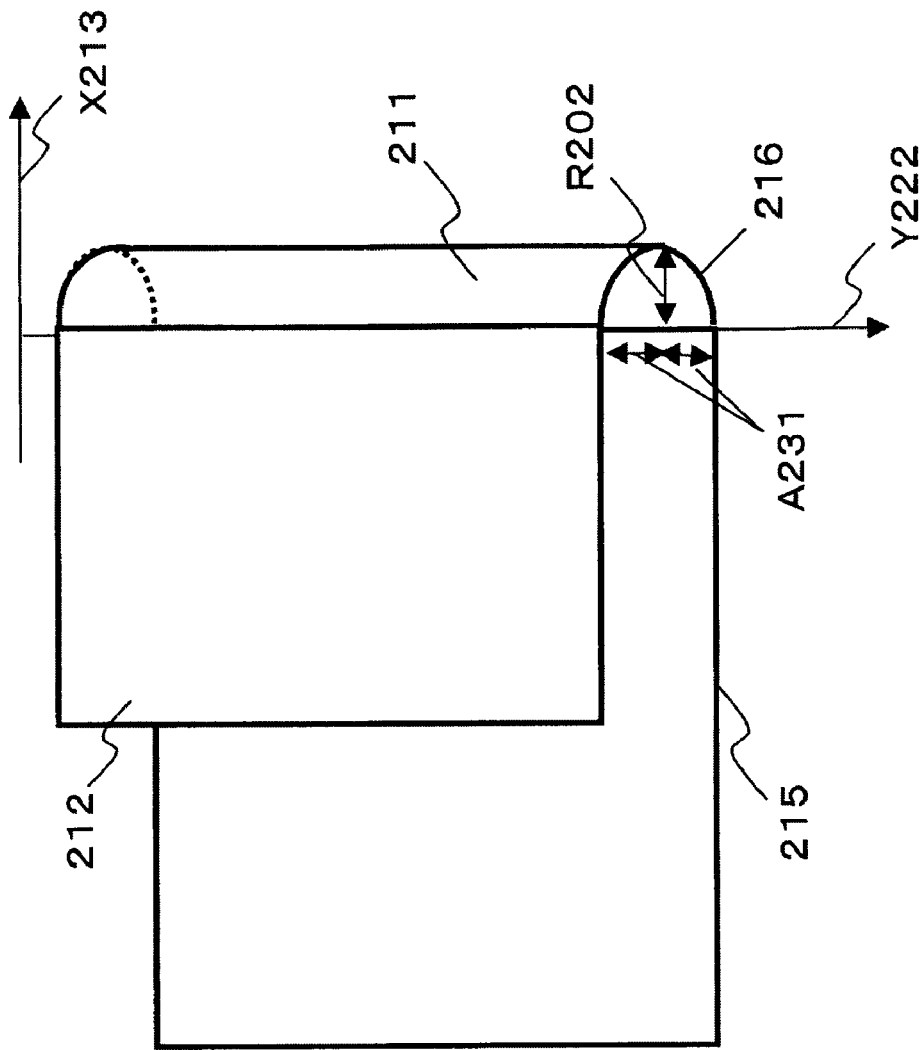
FIG. 19 is a drawing to describe the vertical coordinate calculation specifications in the image special effect apparatus in the related art.
Figure 20:
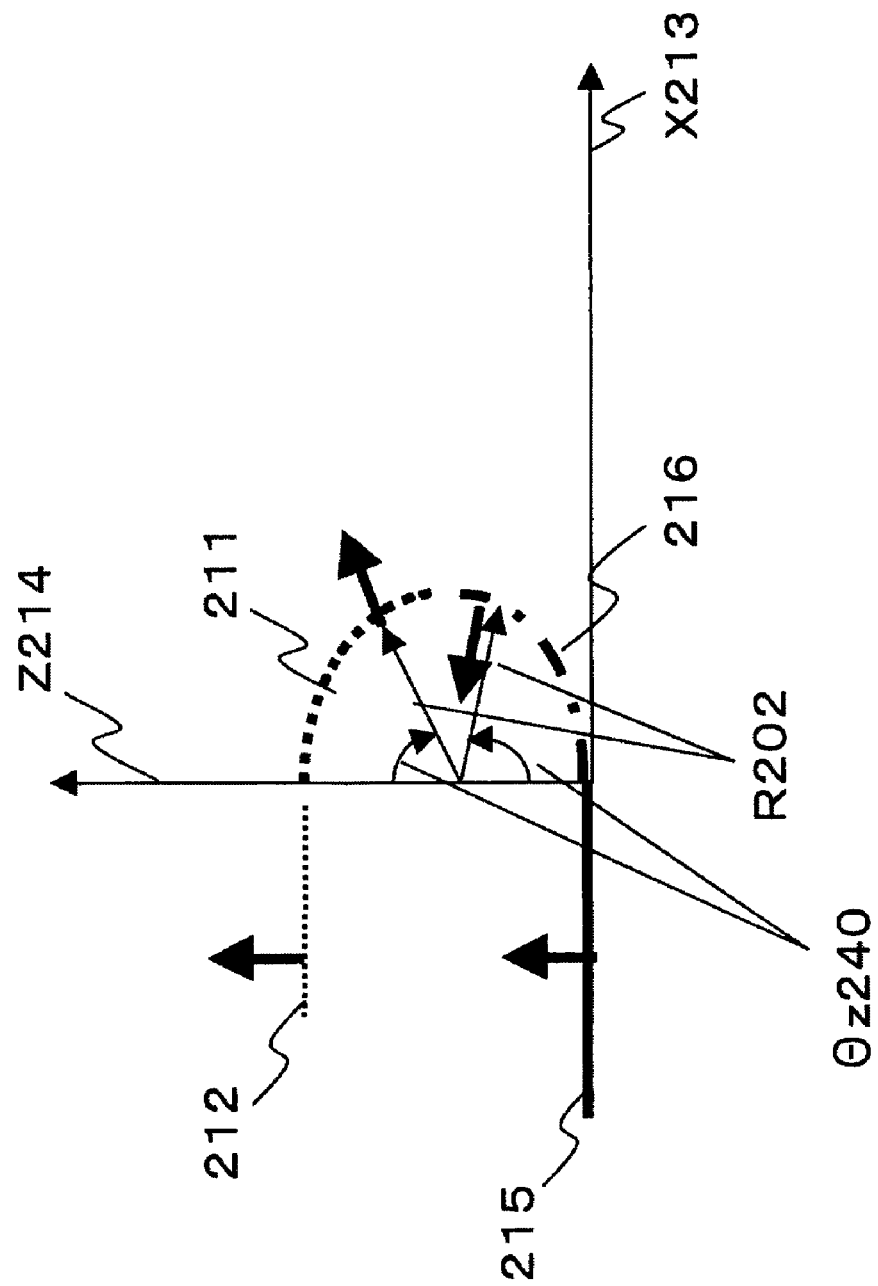
FIG. 20 is a drawing to show normal vectors in the image special effect apparatus in the related art.

FIG. 16 is a diagram to show the configuration of the image special effect apparatus 1600 in the sixth embodiment of the invention. The image special effect apparatus 1600 has a sine value calculation section 250, a cosine value calculation section 204B, a normal vector calculation section 218, and a selector 225. The selector 225 is an example of a selection section.

The sine value calculation section 250 inputs a horizontal coordinate 201 (x) (X201 in FIG. 16) and an effect radius 202 (r) (R202 in FIG. 16) and calculates a sine value 223 (sin θz)=x/r. The cosine value calculation section 204B inputs the sine value 223 (sin θz), performs cosine value calculation according to the following expression, and outputs a cosine value 203 (cos θz):

$$\sqrt{1-\sin^2\theta_z} \qquad \text{Expression 6}$$

The normal vector calculation section 218 is similar to that described in the fifth embodiment.

The selector 225 inputs the sine value 223 (sin θz)=x/r calculated by the sine value calculation section 250 and the calculation result of the normal vector calculation section 218, selects either one according to a mode switch signal 224, and outputs it as n_vector_x of a normal vector horizontal direction component 206. The selector 225 can switch between a horizontal direction component normal vector for the page turn effect from the right to the left and a horizontal direction component normal vector for ball effect and can output as the normal vector horizontal direction component 206.

The image special effect apparatus 1600 in the sixth embodiment of the invention has the sine value calculation section 250 for calculating a sine value of the angle between the eye point direction vector and the normal vector and the selector 225 for selecting either of the sine value calculated by the sine value calculation section 250 and (1−cosine value), (−1+cosine value) of the angle calculated by the normal vector calculation section 218 as the component of the horizontal coordinate of the calculation normal vector used for the illumination effect calculation section to calculate the illumination effect, so that the horizontal direction component normal vector can be switched for output, so that general-purpose illumination effect for ball effect in addition to the page turn effect can be calculated without adding a large-scaled new calculation circuit and the apparatus can be miniaturized.

The embodiment has been described in the case where the illumination effects of the effect of turning a page from the right to the left and the ball effect are switched, but switching may be performed from an image special effect of connecting a flat face and a curved face or a curved face and a curved face other than the page turn effect into another image special effect.

While the invention has been described in detail with reference to the specific embodiments, it will be obvious to those skilled in the art that various changes and modifications can be made without departing from the spirit and the scope of the invention.

This application is based on Japanese Patent Application No. 2006-178445 filed on Jun. 28, 2006 and Japanese Patent Application No. 2006-210103 filed on Aug. 1, 2006, which are incorporated herein by reference.

INDUSTRIAL APPLICABILITY

The invention is widely useful in fields of video production, editing, etc., for example, as an image special effect apparatus, etc., that can process the illumination effects of various image special effects in real time according to the miniaturized configuration. Also, the invention is useful as an image special effect apparatus, etc., that can process the illumination effects of various image special effects in real time according to the miniaturized configuration and can be widely used in fields of video production, editing, etc.

The invention claimed is:

1. An image special effect apparatus for adding, to image information concerning an input image, an illumination effect using light from a light source when viewed from an arbitrary eye point in a face having a curved face, and outputting a video signal provided by mapping the image information to the face, the image special effect apparatus comprising:
a normal vector generation section for generating a normal vector indicating a vector in a normal direction at a position of the face based on rectangular coordinate data indicating the positions of a horizontal coordinate and a vertical coordinate of the face and the shape of the face;
an illumination effect generation section for generating reflectivity of the light in a direction of the eye point by calculation of A(2(LN)N−2L)V where N represents the normal vector, L represents a light source direction unit vector indicating a unit vector in a direction of the light source, V represents an eye point vector indicating a vector in the eye point direction, and A represents an arbitrary value; and
an image information creation section for creating the image information based on the image and the reflectivity.

2. The image special effect apparatus according to claim 1 further comprising an arbitrary value change section capable of changing the arbitrary value A.

3. The image special effect apparatus as claimed in claim 1 or 2 wherein
the illumination effect generation section has a plurality of candidates for the generated reflectivity and generates one reflectivity from among the plurality of candidates.

4. An image special effect apparatus for adding, to image information concerning an input image, an illumination effect using light from a light source when viewed from an arbitrary eye point in a face having a flat face and a curved face, and outputting a video signal provided by mapping the image information to the face, the image special effect apparatus comprising:
a cosine value calculation section for calculating a cosine value of the angle between an eye point direction vector indicating a vector in a direction of the eye point and a normal vector at a position of the face obtained based on the positions of a horizontal coordinate and a vertical coordinate of the face and the shape of the face;
a normal vector calculation section for calculating, as a calculation normal vector, a vector having the cosine value as a component in the eye point direction and (1−cosine value) or (−1+cosine value) of the angle as a component of the horizontal coordinate; and
an illumination effect calculation section for calculating the illumination effect based on the calculation normal vector.

5. The image special effect apparatus according to claim 4, wherein
if the shape is a page turn shape having an upper face and a lower face, the normal vector calculation section calculates a component of a vertical coordinate of the calculation normal vector based on the cosine value calculated by the cosine value calculation section, the position of the vertical coordinate, and an upper face move amount obtained based on the position shift amount of the upper face and the lower face in the vertical direction.

6. The image special effect apparatus according to claim 4 further comprising:
a sine value calculation section for calculating a sine value of the angle between the eye point direction vector and the normal vector; and
a selection section for selecting either of the sine value calculated by the sine value calculation section and (1−cosine value), (−1+cosine value) of the angle calculated by the normal vector calculation section as the component of the horizontal coordinate of the calculation normal vector used for the illumination effect calculation section to calculate the illumination effect.

7. An image special effect method of adding, to image information concerning an input image, an illumination effect using light from a light source when viewed from an arbitrary eye point in a face having a curved face, and outputting a video signal provided by mapping the image information to the face, the image special effect method comprising the steps of:
generating by an image special effects processing apparatus, a normal vector indicating a vector in a normal direction at a position of the face based on rectangular coordinate data indicating the positions of a horizontal coordinate and a vertical coordinate of the face and the shape of the face;
generating reflectivity of the light in a direction of the eye point by calculation of A(2(LN)N−2L)V where N represents the normal vector, L represents a light source direction unit vector indicating a unit vector in a direction of the light source, V represents an eye point vector indicating a vector in the eye point direction, and A represents an arbitrary value; and creating the image information based on the image and the reflectivity.

8. An image special effect method for adding, to image information concerning an input image, an illumination effect using light from a light source when viewed from an arbitrary eye point in a face having a flat face and a curved face, and outputting a video signal provided by mapping the image information to the face, the image special effect method comprising the steps of:

calculating by an image special effects processing apparatus, a cosine value of the angle between an eye point direction vector indicating a vector in a direction of the eye point and a normal vector at a position of the face based on the positions of a horizontal coordinate and a vertical coordinate of the face and the shape of the face;

calculating, as a calculation normal vector, a vector having the cosine value as a component in the eye point direction and (1−cosine value) or (−1+cosine value) of the angle as a component of the horizontal coordinate; and calculating the illumination effect based on the calculation normal vector.

* * * * *